(12) United States Patent
Schwalbe et al.

(10) Patent No.: US 7,101,515 B2
(45) Date of Patent: Sep. 5, 2006

(54) SYSTEM AND METHOD FOR DETERMINING OPTIMAL REACTION PARAMETERS USING CONTINUOUSLY RUNNING PROCESS

(75) Inventors: Thomas Jochen Schwalbe, Brookline, MA (US); Volker Autze, Frankfurt am Main (DE); Sebastian Oberbeck, Weilburg (DE); Ansgar Kursawe, Frankfurt (DE); Kemal Hünkar Sahin, Pittsburgh, PA (US)

(73) Assignee: Cellular Process Chemistry, Inc., Cambridge, MA (US)

( * ) Notice: Subject to any disclaimer, the term of this patent is extended or adjusted under 35 U.S.C. 154(b) by 0 days.

(21) Appl. No.: 10/824,186

(22) Filed: Apr. 14, 2004

(65) Prior Publication Data

US 2005/0013738 A1 Jan. 20, 2005

Related U.S. Application Data

(60) Provisional application No. 60/462,860, filed on Apr. 14, 2003.

(51) Int. Cl.
*B01J 19/00* (2006.01)
(52) U.S. Cl. .......................... 422/130; 422/62; 436/34; 436/55
(58) Field of Classification Search ................ 422/62, 422/130; 436/34, 55
See application file for complete search history.

(56) References Cited

U.S. PATENT DOCUMENTS

| | | | | |
|---|---|---|---|---|
| 3,881,701 | A | 5/1975 | Schoenman et al. ............ 259/4 |
| 4,222,671 | A | 9/1980 | Gilmore ..................... 366/337 |
| 4,702,073 | A | 10/1987 | Melconian ..................... 60/39 |
| 4,728,502 | A | 3/1988 | Hamill ........................ 422/116 |
| 4,748,002 | A | 5/1988 | Niemark et al. ............. 422/116 |
| 4,894,146 | A | 1/1990 | Giddings ................... 209/12.2 |
| 5,122,345 | A | 6/1992 | Tabor et al. ................ 422/116 |
| 5,209,906 | A | 5/1993 | Watkins et al. ............. 422/200 |
| 5,250,263 | A | 10/1993 | Manz .......................... 422/81 |
| 5,273,715 | A | 12/1993 | Bridgham et al. ............. 422/63 |
| 5,288,468 | A | 2/1994 | Church et al. .............. 422/116 |
| 5,324,483 | A | 6/1994 | Cody et al. ................. 422/131 |
| 5,399,317 | A | 3/1995 | Stolowitz ..................... 422/99 |
| 5,463,564 | A | 10/1995 | Agrafiotis ................... 364/496 |
| 5,468,643 | A | 11/1995 | Su et al. ..................... 436/161 |
| 5,482,862 | A | 1/1996 | LaPack et al. ................ 436/52 |
| 5,499,650 | A | 3/1996 | McArthur et al. ............. 137/85 |
| 5,516,423 | A | 5/1996 | Conoby et al. ............... 210/85 |
| 5,534,328 | A | 7/1996 | Ashmead et al. ............ 428/166 |
| 5,580,523 | A * | 12/1996 | Bard ........................... 422/50 |
| 5,595,712 | A | 1/1997 | Harbster et al. ............. 422/129 |
| 5,641,400 | A | 6/1997 | Kaltenbach et al. ........ 210/198 |
| 5,644,395 | A | 7/1997 | Folta ........................... 356/246 |
| 5,681,534 | A | 10/1997 | Neves ........................ 422/131 |
| 5,690,763 | A | 11/1997 | Ashmead et al. ............. 156/60 |
| 5,698,485 | A | 12/1997 | Brück et al. .................. 501/87 |
| 5,705,018 | A | 1/1998 | Hartley ....................... 156/345 |
| 5,727,618 | A | 3/1998 | Mundinger et al. ........ 165/80.4 |
| 5,730,947 | A | 3/1998 | Chaussonnet ............... 422/177 |
| 5,741,466 | A | 4/1998 | Bodnaras ................... 422/228 |
| 5,803,600 | A | 9/1998 | Schubert et al. ............ 366/144 |
| 5,811,062 | A | 9/1998 | Wegeng et al. ............. 422/129 |
| 5,928,880 | A | 7/1999 | Wilding et al. ............. 435/7.21 |
| 5,939,024 | A | 8/1999 | Robertson ................... 422/101 |
| 5,961,932 | A | 10/1999 | Ghosh et al. ............... 422/193 |
| 5,976,472 | A | 11/1999 | Chatterjee et al. .......... 422/130 |
| 5,993,750 | A | 11/1999 | Ghosh et al. ............... 422/191 |
| 6,036,355 | A | 3/2000 | Yant et al. ................... 366/171 |
| 6,036,927 | A | 3/2000 | Chatterjee et al. .......... 422/211 |
| 6,063,019 | A | 5/2000 | Wade ........................... 494/14 |
| 6,126,723 | A | 10/2000 | Drost et al. ..................... 96/4 |
| 6,149,882 | A | 11/2000 | Guan et al. ................. 422/211 |
| 6,171,865 | B1 | 1/2001 | Weigl et al. .................. 436/52 |
| 6,180,081 | B1 | 1/2001 | Poschmann et al. ........ 423/648 |
| 6,190,034 | B1 | 2/2001 | Nielsen et al. ............. 366/336 |
| 6,192,596 | B1 | 2/2001 | Bennett et al. ................ 34/76 |
| 6,221,226 | B1 | 4/2001 | Kopf-Sill ..................... 204/602 |
| 6,264,900 | B1 | 7/2001 | Schubert et al. ............ 422/224 |
| 6,494,614 | B1 | 12/2002 | Bennett et al. ............... 336/36 |
| 6,537,506 | B1 | 3/2003 | Schwalbe et al. ........... 422/130 |

(Continued)

FOREIGN PATENT DOCUMENTS

DE 960 183 3/1957

(Continued)

OTHER PUBLICATIONS

Van den Berg, A et al. 1996. "Modular Concept for Miniature Chemical Systems." *DECHEMA Monographs*: 132:109-23.

*Primary Examiner*—Jill Warden
(74) *Attorney, Agent, or Firm*—Ronald M. Anderson

(57) ABSTRACT

A reaction system enables a plurality of optimization experiments for a reaction to be performed continuously, to enable optimal reaction parameters to be determined. Dilution pumps are included to automatically vary the solvent mixed with reactants so a concentration of each reactant can be selectively varied. The reactants are introduced into a reaction module selectively coupled to residence time chambers or directly to an analytical unit. The analytical unit determines the yield and/or quality for each optimization experiment, enabling optimal parameters to be determined. Residence time chambers can be employed sequentially to enable total residence time to be varied. The controller performs as many experiments as required to enable each parameter to be varied according to a predefined testing program and can redefine a testing program based on the results from previous experiments. At least two reaction parameters can be varied according to periodic functions to further enhance analytical efficiency.

15 Claims, 11 Drawing Sheets

U.S. PATENT DOCUMENTS

| | | |
|---|---|---|
| 6,656,423 B1 | 12/2003 | Joslyn .......................... 422/1 |
| 6,701,774 B1 | 3/2004 | Srinivasan et al. ........ 73/23.42 |
| 6,827,095 B1 | 12/2004 | O'Connor et al. ....... 137/15.01 |
| 2002/0042140 A1 | 4/2002 | Hagemeyer et al. .......... 436/34 |
| 2002/0045265 A1 | 4/2002 | Bergh et al. .................. 436/37 |
| 2002/0080563 A1 | 6/2002 | Pence et al. ................. 361/676 |
| 2002/0151080 A1* | 10/2002 | Dasgupta et al. ............. 436/55 |
| 2002/0170976 A1 | 11/2002 | Bergh et al. ............... 236/49.1 |

FOREIGN PATENT DOCUMENTS

| | | |
|---|---|---|
| DE | WO 00/62914 | 10/2000 |
| EP | 0796654 | 3/1997 |
| GB | WO 00/34728 | 6/2000 |
| WO | WO 87/02139 | 4/1987 |
| WO | WO 93/00625 | 1/1993 |
| WO | WO 98/38487 | 3/1998 |
| WO | WO 99/04892 | 7/1998 |
| WO | WO 98/55812 | 12/1998 |
| WO | WO 99/20395 | 4/1999 |
| WO | WO 00/51720 | 9/2000 |
| WO | WO 00/62919 | 10/2000 |
| WO | WO 01/41916 | 6/2001 |
| WO | WO 01/66245 | 9/2001 |
| WO | WO 01/68257 | 9/2001 |
| WO | WO 01/93998 | 12/2001 |

* cited by examiner

HIGHEST IMPROVEMENT—
SIMULTANEOUS ANALYSIS OF OPERATING CONDITIONS

SYSTEM AND METHOD FOR DETERMINING OPTIMAL REACTION PARAMETERS USING CONTINUOUSLY RUNNING PROCESS

RELATED APPLICATIONS

This application is based on a prior provisional application Ser. No. 60/462,860, filed on Apr. 14, 2003, the benefit of the filing date of which is hereby claimed under 35 U.S.C. § 119(e).

FIELD OF THE INVENTION

This invention generally relates to a chemical processing apparatus, and more specifically, to a continuously operating system configured to vary reaction parameters over time in order to identify optimal reaction parameters.

BACKGROUND OF THE INVENTION

Apparatus for controlling and optimizing the production of chemical substances are well known in the prior art. Reaction parameters effecting the quantity and quality of the product generated include concentration levels of each reactant, temperature conditions, flow rates, and residence times. Varying one or more of the reaction parameters generally results in a change in product yield. It is therefore advantageous to optimize such reaction parameters to maximize production and quality.

A basic prior art optimization procedure is as follows. Initial reaction conditions from an initial synthesis are used as a starting point. Using temperature, reaction time and concentrations at the values determined in the initial synthesis, three experiments with different equivalents (i.e. different stoichiometric ratios) are conducted. For example, where the initial synthesis was based on using a 1:1 ratio of a first reactant and a second reactant, ratios such as 1:1.1, 1:1.2, 1.1.3, 1.1:1, 1.2:1, and 1.3:1 could be employed. In a second set of experiments, three different temperature conditions are applied. A third and fourth set of three experiments each are also performed, changing other variables in each set. After twelve such experiments have been performed (i.e., four sets of three experiments), the results are reviewed, and optimized reaction parameters are defined, based on the data collected from the twelve experiments. An additional set of twelve experiments can then be performed, similarly varying the optimized parameters defined by the first series of experiments. In such an optimization procedure, typically twenty four experiments are required for a first optimization of reagent equivalents, temperature conditions, reaction time, and reagent concentration for a given reaction, as each experiment is repeated to check the reproducibility of the results. One disadvantage of this approach is that interactions between these parameters are difficult to quantify.

Because of this difficulty, process optimization methods referred to as statistical design experiments have been developed. The goal of such methods is to model an equation in order to couple process variables with process results (i.e., the yield of a reaction). A well known two-value approach requires $2^n+1$ experiments, where n is the number of variables. Each variable is employed at two different values, and an additional experiment is performed using the mean of each variable (as a control to determine if the behavior is linear). Typically, every experiment is repeated to estimate the reproducibility. For the above-mentioned case, $(2^4+1)$ *2=34 experiments are needed. The disadvantage of such an empirical approach is the fact that the success of the optimization is largely based on how well each of the two values for each variable is selected. Selecting levels that are close together results in only small improvements in optimization being achieved; so that it is likely an additional $2^n+1$ sets of experiments will be required. Selecting values that are far apart results in a risk that one or more variables will exceed a critical parameter, which will significantly affect yields (such as exceeding a reaction temperature beyond which yield drops sharply or no reaction takes place). When this result occurs, the initial set of $2^n+1$ experiments are of little value, and the experiments must be repeated after different values have been selected.

Furthermore, if the mean value experiment indicates that non linear behavior exists, then it is necessary to determine the impact of quadratic terms. This step can only be assessed by expanding the design of experiments to $3^n$ experiments, where the three values are defined as the lower and upper bounds, as well as the mean values of these bounds. For the analysis of a four-parameter system, this approach implies a total of $3^4=81$ experiments will be required. Preferably, each set is repeated to validate reproducibility, so that a total of 162 experiments must be performed. In practice, some terms and factors in an equation model are often identical, and it is not unusual for the 81 experiments noted above to be reduced to about 40 experiments (without the duplication for validation of reproducibility).

This analysis can be performed efficiently using software packages that determine the values for each experiment, the order in which these values should be changed, and evaluate the outcome to provide a mathematical relationship between the performance criteria being investigated and the variables to be adjusted to optimize the performance. Today, equipment for parallel batch experiments is also available, so that a number of experiments can be conducted at the same time. These parallel analysis systems are based on matrices of reaction modules in which the chemicals to be analyzed are input manually at variable concentrations. Some reaction conditions, such as temperature, are often identical for all the vessels being analyzed at any given time due to the physical dimensions and limitations of the system. The reaction duration is also generally identical for efficient analysis. Due to the discrete nature of experimentation, the evaluation at the end of the experiment has to be performed for all reaction modules separately, to determine the performance of each system. These results are analyzed off-line as one data set for a fixed temperature and reaction duration. Experimentation at different reaction temperatures requires the generation of another matrix with the same reactants, and repetition of the experiments at the new temperature, as well as a new analysis of the collected data. Once the analysis for concentrations and concentration ratios at different temperatures is completed, the same set of experiments can be performed to determine the effect of reaction time on yield. The repetitiveness of such experiments (i.e., the batch-like processing) is enforced due to the matrix-like structure of the parallel reaction vessels.

While such methods can enable optimized reaction parameters to be achieved, it would be desirable to provide a method and apparatus based on optimizing reactions parameters using a continuously running system, as opposed to using the batch-based testing of the prior art.

SUMMARY OF THE INVENTION

The present invention employs a continuously operating system that enables reaction parameters to be varied over time, to optimize a chemical reaction. The time to achieve optimization is thus dramatically reduced compared to the prior art batch-based optimization techniques discussed above.

The system employed includes a reaction module (preferably including a micro reactor, so that minimal reactant volumes are required) a plurality of residence time chambers, fluid lines coupling the micro reactor to the residence time chambers, fluid lines for introducing reactants into the reaction module, and fluid lines for directing a product exiting the reaction module into either residence time chambers or to an analytical unit. Pumps are employed to move fluid through the system, and temperature control is achieved using heat exchangers. The system is controlled by a processor, which in one preferred embodiment is implemented using a personal computer. The analytical unit is configured to analyze each product produced by the system. Based on the analysis, the controller identifies the process conditions that provide the highest yield of product.

For optimization of reactions, the relative concentrations of reactants must be varied. Prior art optimization methods generally require batches of reactants at different concentrations levels to be prepared before a set of reactions are executed. In the present invention, dilution pumps are coupled to reactant feed lines and a solvent supply. The controller can vary the amount of solvent introduced into a reactant supply line, thereby automatically varying the concentrations of the reagents. Thus, the manual preparation of the reagent solutions at different concentrations of the prior art is eliminated. Not only does elimination of manually preparing reagent solutions of differing concentrations save time, but the fact that the reactant supply vessels need not be physically disconnected from the system eliminates problems associated with pausing the reaction operation to change reactant supply vessels. The controller can be configured to vary concentration randomly, or more preferably, according to a predefined protocol. The ability to manipulate flow rates of individual reactants, and the ability to add diluting solvents to manipulate the concentrations of each reactant enable an infinite number of combinations of flow rates and reactant concentrations to be achieved. The flexibility the reactant pumps and dilution pumps enables concentration variations to be explored continuously, whereas in the prior art, after a first set of experiments were executed, new solutions having different concentrations had to be prepared before additional optimization experiments could be performed.

Each reactant (generally at least two reactants are employed, although those of ordinary skill in the art will recognize that other types of reactions can be optimized, such as those using a single reactant and a catalyst, or three or more reactants) is introduced into the reaction module, where the reactants are mixed under the desired temperature conditions, and the reaction is initiated. The combined reactants are then directed into a first one of the plurality of residence time chambers. The mixed reactants are pumped through the residence time chambers for a period of time sufficient to enable the reaction to be completed. Adjustments in the residence time can be achieved by modifying the flow rates of both reactants. The residence time chambers are employed sequentially, such that mixed reactants/product exiting one residence time chamber are directed to a downstream residence time chamber for addition holding time. Residence time can also be varied by employing no residence time chambers for some reactions, some residence time chambers for other reactions, and all residence time chambers for still other reactions. Significantly, major step changes in residence time can be analyzed efficiently by selectively changing the number of residence time chambers used for a particular reaction. Routing a product through one or more residence time chambers is achieved using appropriate valving. Through intelligent valve switching algorithms, information on multiple residence times can be obtained efficiently. In contrast, prior art optimization techniques either explored incremental changes in residence times, or explored larger changes by removing or installing residence time chambers, which generally required bringing the system to a temperature where an operator can install/remove a residence time chamber, purge both the heat transfer fluid and reactant/product liquids, reassemble the system, and heat up the system up to operating conditions before additional experimentation can be performed.

The present invention encompasses methods for using such a continuously operating system for optimization of reaction parameters, or continuous kinetic parameter evaluations of chemical reactions. The primary goal of such methods is the efficient and rapid determination of optimal reaction performance criteria, such as yield, conversion, and selectivity. Operating conditions such as temperature, reactant concentrations, reactant concentration ratios, and residence times can be modified. Using these operating conditions and the resulting performance data, it is possible to calculate important chemical reaction parameters, such as activation energies, and reaction orders for the reactants being analyzed. Since these parameters are independent of the reactor used, the information can be used for numerically optimizing the performance of the reaction in any vessel.

The optimization experiments can be performed according to several different protocols. In one embodiment, testing conditions are predefined, and the system is operated continuously until the predefined range of each variable is tested. The optimal reaction conditions providing the maximum performance can be evaluated after the entire range of parameters has been analyzed and all data has been collected. In another embodiment, the optimization can be performed real-time. In this mode of operation, the performance information is reviewed as soon as it is obtained, to determine if new testing conditions can be defined based on the data obtained from previous experiments. In yet another embodiment, specific reaction parameters, such as temperature, concentration, and reactant equivalence are varied according to periodic functions, while data are continuously collected. These data can then be reviewed to identify optimal operating conditions. Reactant equivalence (stoichiometric ratio) can be varied based on changes to concentrations of individual reactants, as well as by manipulating flow rates.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 1A schematically illustrates a continuous flow optimization system in accord with the present invention;

FIG. 1B schematically illustrates the system of FIG. 1A with valves having been manipulated to direct a flow of fluid exiting a reaction module to an analytical unit, thus bypassing each residence time chamber;

FIG. 1C schematically illustrates the system of FIG. 1A with valves having been manipulated to direct a flow of fluid exiting the reaction module to a first residence time chamber, and then to the analytical unit, thus bypassing the second and third residence time chambers;

FIG. 1D schematically illustrates the system of FIG. 1A with valves having been manipulated to direct a flow of fluid exiting the reaction module to the first residence time chamber, then to the second residence time chamber, and then to the analytical unit, thus bypassing the third residence time chamber;

FIG. 1E schematically illustrates the system of FIG. 1A with valves having been manipulated to direct a flow of fluid exiting the reaction module to the first residence time chamber, then to the second residence time chamber, then to the third residence time chamber, and finally to the analytical unit, thus achieving a maximum residence time;

FIG. 1F schematically illustrates a preferred configuration for residence time chambers and the reaction module of the system of FIG. 1A;

DESCRIPTION OF THE PREFERRED EMBODIMENT

Figure 1A:
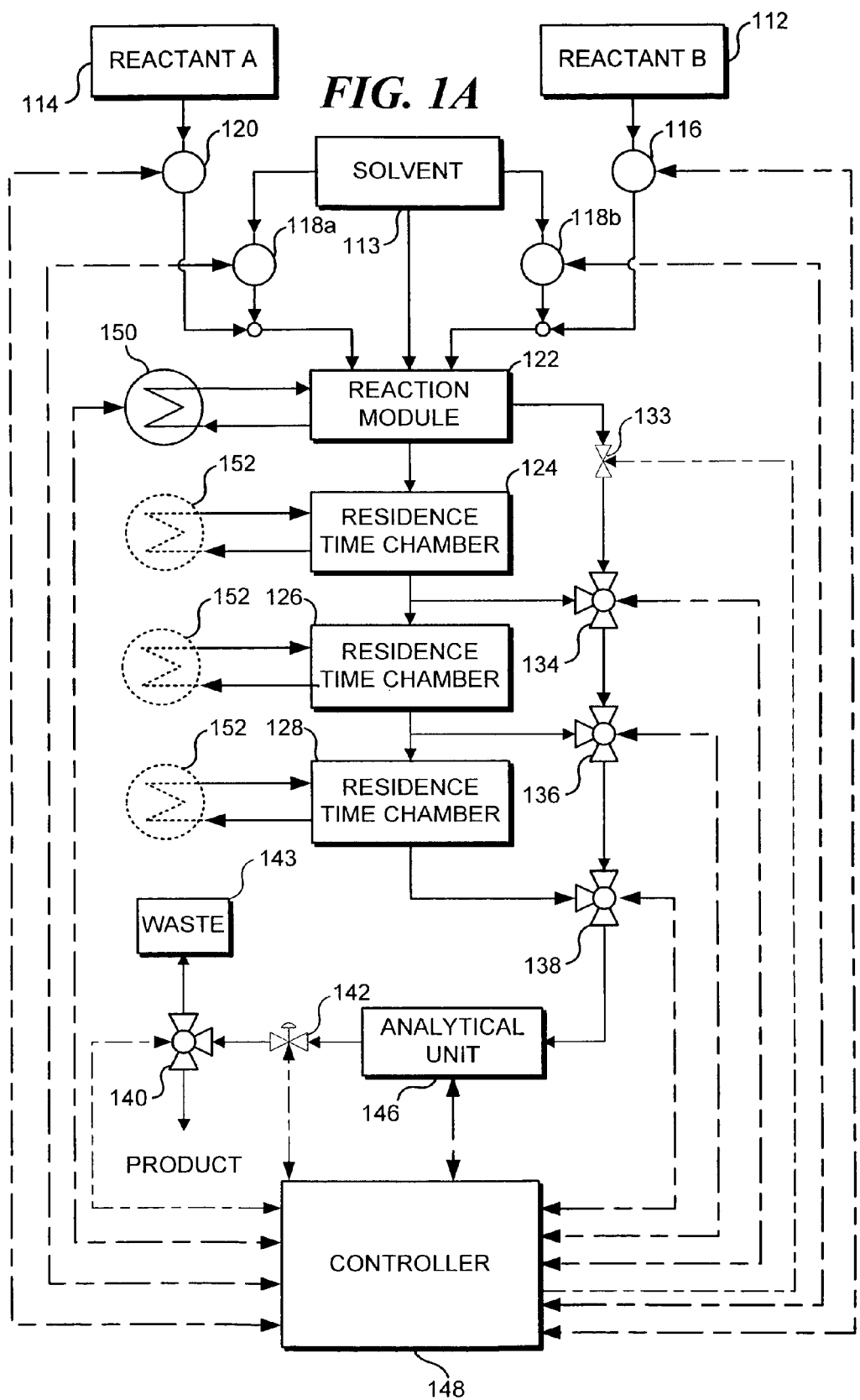

The present invention employs a continuously operating system that enables reaction parameters to be varied over time, to dramatically reduce the time needed for optimizing a chemical reaction, compared to the prior art batch-based optimization techniques discussed above. FIG. 1A illustrates the functional elements of an automatically controlled, continuously running reaction optimization system 110. A system controller 148 is used to control the system, including selecting reactant concentrations and controlling reactant flow rates, solvent flow rates, temperature conditions, pressure conditions (for systems configured to vary pressure conditions), and residence times. System controller 148 preferably comprises a computer or other programmable computing device; however, it should be understood that an application specific integrated circuit (ASIC) can alternatively be beneficially employed for the system controller. System controller 148 is operatively connected (through connectors A) to a Reactant A pump 120 (which is associated with selecting a flow rate for Reactant A), a Reactant B pump 116 (which is associated with selecting a flow rate for Reactant B), a Solvent A dilution pump 118a (which is associated with controlling a concentration of Reactant A), a Solvent B dilution pump 118b (which is associated with controlling a concentration of Reactant B), a reaction module 122 (in which Reactant A and Reactant B are thermally conditioned and mixed), a heat exchanger 150 (for controlling thermal conditions inside reaction module 122), a plurality of residence time chamber valves 133, 134, 136, and 138 (which, as will be discussed in greater detail below, enable an inline analytical unit to receive a fluid from the reaction module, or from a specific residence time chambers/residence time units), an outlet valve 140, a waste container 143, an automatic online analytical unit 146 (i.e. a detection device), and an optional throttle valve 142. If desired, additional heat exchangers 152 can be employed, such that system controller 148 can independently control the temperature in each residence time chamber.

Heat exchanger 150 is coupled in fluid communication with reaction module 122 and employs a temperature-conditioned fluid to control the temperature within the chemical reactor. Similarly, if used, optional heat exchangers 152 are coupled in fluid communication with each residence time chamber 124, 126 and 128, to employ a temperature-conditioned fluid for controlling the temperature within each residence time chamber. Alternatively, the temperature-conditioned fluid from heat exchanger 152 can also be coupled in fluid communication with each residence time chamber, to control its temperature circulating the temperature-conditioned fluid therethrough. However, in such a configuration, the temperature condition in each residence time chamber cannot readily be independently varied. Particularly where one optimization parameter to be explored is providing different thermal conditions to residence time chambers versus a reaction module, the ability to independently control thermal conditions in each residence time chamber is desirable and can be implemented by using a separate temperature regulated fluid to control the temperature in the residence time chamber(s).

The volumes of Reactant A supply 114 and Reactant B supply 112, as well as the volumes of solvent supply 113, are functions of the reaction to be optimized. For example, if two parts of Reactant A need to be mixed with one part of Reactant B, then about twice as much Reactant B ought to be available. Preferably, sufficient volumes of each reactant and solvent are provided such that system 110 can be operated continuously until each optimization parameter has been tested, so the system does not have to be shut down to re-supply a required fluid. As noted above, many reactions requiring optimization will be based on combining two different reactants that react under appropriate conditions to generate a desired product. However, some reactions are based on exposing a single reactant to a catalyst under specific conditions to achieve a desired product, and other reactions are based on combining more than two reactants to achieve a desired product. Those of ordinary skill in the art will readily recognize that system 110 can be simply modified to enable optimization reactions to be continuously performed for reactions requiring less than, or more than, the two reactants indicated in FIG. 1A. Thus, the present invention is not limited to the optimization of reactions utilizing two reactants, although a significant use of the present invention will likely be for the optimization of such reactions. Reactant A and Reactant B will generally be liquids, although one or both of the reactants can be gaseous. Solid reactants will generally be dissolved or suspended in a liquid for ease of handling and processing in the system, before being placed in supply 112 or supply 114.

The solvent employed must be compatible with Reactant A and with Reactant B. In most applications, a common solvent will exist for both Reactant A and Reactant B, and a single solvent supply can be employed. If necessary, separate solvent supplies can be provided, with a first solvent being used to dilute Reactant A, and a second solvent that is different than the first being used to dilute Reactant B. Solvent in the present invention is employed to selectively vary the concentration of Reactant A and Reactant B, to enable the effects of varying the concentrations of the reactants on product yield and quality to be determined. Those of ordinary skill in the art will readily recognize that the selection of an appropriate solvent for a specific reactant (or pairs of reactants) is well within the skill of the ordinary practitioner of this art. In addition to be employed to change a relative concentration of a reactant, the solvent can also be employed to flush the system. Because the same reagents are being employed in the plurality of optimization experiments, it is likely that the system will not need to be flushed between every experiment. Particularly for optimizations requiring many different optimization experiments, it may be desirable to periodically flush the system to minimize any residue from building up in the reaction module, residence time modules, and fluid lines. Such flushing may be performed more frequently when the reactants or products have a relatively high viscosity.

Pump 120 controls the flow rate of Reactant A, and pump 116 controls the flow rate of Reactant B. When performing optimization experiments for a specific reaction, flow rates will at times be held constant (while other parameters are varied), and at times, the flow rate(s) will be the parameter(s) that are being varied. Dilution pump 118a is employed to change the relative concentration of Reactant A, by introducing a solvent into the flow of Reactant A entering the reactor. Dilution pump 118b is similarly employed to change the relative concentration of Reactant B, by introducing a solvent into the flow of Reactant B entering the reactor. When solvent is added to dilute a reactant and a flow rate for that reactant is to be held constant, preferably a flow rate of that reactant will be decreased by an amount required to offset an increase in flow rate attributable to the solvent. A variety of different types of pumps can be beneficially employed. Preferably, each heat exchanger will incorporate its own pump (not separately shown) to supply the temperature-conditioned heat transfer medium to the reaction module (or residence time chamber), under the control of system controller 148.

While not shown, it is expected that pressure sensors and filters can optionally be used in association with each pump in system 110. A signal produced by the pressure sensors will provide confirmation to system controller 148 that the reactants are flowing, and the filters can be employed to filter any particulate matter that may have contaminated Reactant A supply 114, Reactant B supply 112, solvent supply 113, and/or any heat transfer fluid. In a preferred embodiment in which the reaction module incorporates a micro reactor, these filters are particularly important, since the fluid channels within a micro reactor are characteristically very small in size. Thus, even relatively small particles can clog these channels and significantly impair the efficiency of the micro reactor. Preferably, system controller 148 is programmed to alert a user to check the filters when pressure sensors indicate a change in pressure in the system, as such a pressure change may be indicative of a clogged filter. If desired, system controller 148 can be configured to periodically terminate the flow of reactants in the system, so that the solvent supply can be used to flush the system.

As noted above, reaction module 122 is preferably implemented as a micro reactor, such that only relatively small volumes of reagents are required for each optimization experiment. So long as the volume of product produced is sufficient to enable accurate analysis, there is no need to generate large volumes of product during optimization experiments. It should be noted that FIG. 1A does not attempt to illustrate the fluid paths of reactants within reaction module 122. Two reactants are directed into reaction module 122, and either a single desired chemical product exits the reaction module 122, or alternatively, mixed and partially reacted reactants exit the reaction module and enter one or more residence time chambers, to be pumped through for a period of time to enable the reaction to complete. Thus, it will be appreciated that reaction module 122 includes at least a mixing unit, and that thermal conditions inside reaction module 122 are controlled.

While in one preferred embodiment, the chemical reactor within reaction module 122 is a micro reactor, a macro-scale reactor could alternatively be used in the present invention. Micro reactors are generally characterized as incorporating fluidic structures of less than 1 mm in size, especially with respect to reactant fluid pathways. However, the present invention is not limited to reaction modules that include a micro reactor, because it is also contemplated that the reaction module can incorporate a chemical reactor whose fluidic structures are larger or even substantially larger in size than the micro-scale fluidic structures generally associated with micro reactors.

If required, reaction module 122 will include structural elements necessary to facilitate the reaction between the two reactants selected. In some cases, one of the reactants may need to be exposed to a catalyst for a reaction to be initiated or carried out efficiently. Other reactions require an electrochemical, a photochemical, and/or other forms of stimulus. Process parameters that can be beneficially incorporated into reactors for use in the present invention including magnetic, piezoresistive, piezoelectric, shape memory, radioactive, catalytic, optical, electromagnetic, and electrostatic parameters. Each such parameter is preferably capable of being controlled by system controller 148.

Once a quantity of Reactant A and a quantity of Reactant B (diluted as required using dilution pumps 118a and 118b) have been introduced into reaction module 122 and have been suitably mixed and thermally conditioned, the mixed reactants can either be routed to analytical unit 146 for analysis, or introduced into one of residence time chambers 124, 126, and/or 128, by manipulating appropriate one or more of valves 133, 134, 136, and 138. FIGS. 1B–1E, discussed in detail below, illustrate the flow paths for directing fluid from reaction module 122 to analytical unit 146 without passing through any residence time chamber (FIG. 1B), directing fluid from reaction module 122 to residence time module 124, and then to analytical unit 146 (bypassing residence time chambers 126 and 128; FIG. 1C), directing fluid from reaction module 122 to residence time module 124, then to residence time chamber 126, and then to analytical unit 146 (bypassing residence time chamber 128; FIG. 1D), and directing fluid from reaction module 122 to residence time module 124, then to residence time chamber 126, then to residence time chamber 128, and then to analytical unit 146 (thereby achieving a maximum residence time for a given flow rate; FIG. 1E). Those of ordinary skill in the art will recognize that other valve configurations can be employed to achieve the same functionality (i.e. the ability to select a flow path between the reaction module and the analytical unit, such that a desired number of residence time units are utilized). One alternative configuration would be to utilize a fewer number of multi-port valves. Thus, the specific valve configuration shown is intended to be exemplary, rather than limiting the scope of the present invention. Outlet valve 140 enables controller 148 to direct fluid either to waster container 143 or toward a product outlet. The optional throttle valve 142 enables controller 148 to selectively vary pressure conditions in system 110, by reducing a flow rate downstream of valve 142 (i.e., toward valve 140), which causes the pumps upstream of valve 142 (the solvent pumps and the reagents pumps) to increase the pressure in the reaction module and any residence time chambers being used.

Residence time chambers can be used in a variety of ways. For example, residence time chambers can be used to enable a higher throughput to be achieved, by selecting a flow rate that causes partially reacted reagents to be discharged from the reaction module before the reaction is complete. In such an embodiment, residence time chambers are used in parallel. The residence time chambers in the present invention can also be used sequentially (i.e., wherein a material exits the reaction module and is directed into a first residence time chamber, and is then subsequently directed from the first residence time chamber into one or more additional residence time chambers coupled in series, before being analyzed by the inline analysis unit). The valving of system 110 enables product/mixed reactants exiting reaction module 122 to be directed into the analytical unit after passing through residence time chamber 124 only, after passing through residence time chambers 124 and 126, or after passing through residence time chambers 124, 126 and 128. If only one of the residence time chambers is to be used, then product/mixed reactants exiting the reaction module are directed into residence time chamber 124, and then diverted to the analytical unit before such fluid enters the additional residence time units. As a further example, if all three residence time chambers are used, then the product/mixed reactants exiting the reaction module are directed in residence time chamber 124, then into residence time chamber 126, and finally into residence time chamber 128, and then diverted to the analytical unit. Using residence time chambers sequentially enables the present invention to vary residence time as one of the reaction parameters, so that data can be collected, and an optimal residence time determined.

As noted above, using residence time chambers enables more reactions to be processed per unit time by reaction module 122. The reagents are mixed and thermally conditioned in reaction module 122 and then transferred to one or more residence time chambers sequentially. While three residence time chambers are shown, it should be understood that additional residence time chambers can be employed. For example, if the reaction to be optimized requires five minutes for the reaction to complete, and mixing and thermal conditioning can be achieved in reaction module 122 in one minute, then four residence time chambers (numbered 1–4), each of which has a volume sufficient such that at a predefined flow rate it will take a minute for a fluid to pass through the residence time chamber, will enable the reagents to be continually introduced into the reaction module. The first set of reagents (i.e., predetermined quantities of Reagent A and Reagent B, which can be identical if a parameter such as temperature is being tested) will be introduced into reaction module 122, mixed and thermally conditioned, and directed to residence time chamber 1. The fluid exiting residence time chamber 1 has been processed for two minutes (one minute in the reaction module and one minute in residence time chamber 1), and is directed to residence time chamber 2 (for an additional minute of processing time). The fluid exiting residence time chamber 2 is directed to residence time chamber 3 (for yet another minute of processing time). The fluid exiting residence time chamber 3 is directed to residence time chamber 4, for the fifth required minute of processing time. Note that after the initial fluid exits from residence time chamber 1, additional fluid is exiting the reaction module and entering residence time chamber 1. This simplified scenario does not include the times required for filling and emptying the residence time chambers (or the reaction module), but it does demonstrate how the use of residence time chambers enables the system to operate continuously, when the reaction module itself does not provide the required residence time for the reaction to complete.

Adjustments in the residence time can also be achieved by modifications of the flow rates of the reagents (and solvent, if employed to vary a reagent concentration). Because pumps generally exhibit linear behavior over a limited range, reactant flow rates can be accurately varied only throughout a defined range by controlling a speed of the pumps. Generally, this range enables flow rates to be varied over at least one order of magnitude. Hence, the residence time impact can be analyzed for a factor of 10–20, for a fixed system volume.

Preferably, heat exchangers 152 are employed to maintain the same thermal conditions in the residence time chambers as are present in reaction module 122. As noted above, one optimization parameter that could be tested is the effect of different residence time chambers temperatures on product yield and/or quality.

In one embodiment of the present invention, each residence time chamber includes a helically-coiled capillary passage, and the length of the capillary passage controls a residence time of the reactants in the residence time chamber. In a preferred embodiment in which reaction module 122 includes a micro reactor, the capillary passage is of sufficient length to achieve a 45-minute residence time at a flow rate of one milliliter per minute. Generally, a residence time of 45 minutes is sufficient for the majority of most chemical reactions to reach completion. However, different reactions can require different residence times, and the residence time chambers must be matched to the requirements of the reaction being optimized. Furthermore, while capillary passages can serve as effective residence time chambers, it should be understood that the specific design of each residence time chamber is not critical. As long as each residence time chamber provides a sufficient volume in which the incompletely reacted mixture of reactants exiting the reaction module can reside until the reaction is complete, the particular physical configuration of the volume is not critical.

Various reactions can be performed in system 110 that are pressure dependent. For example, reactions involving decreasing volumes, increasing boiling points, or increasing gas concentrations in a liquid phase are pressure dependent. Thus, it may be desirable to enable a reaction to occur at a predefined pressure. To increase the pressure along a reaction path requires a throttle at the distal end of the reaction path. Preferably, valve 142 acts as a throttle, so that partially closing the valve causes pumps 116, 118*a*, 118*b* and 120 to produce higher pressures in the reaction module (and residence time chambers) in order to maintain a constant flow rate. Note that valve 142 is optional, because while the ability to vary pressure conditions is useful, many other optimization experiments can be performed without changing pressure conditions (i.e. by varying parameters such as concentration, stoichiometric ratios, temperature, and residence time).

With respect to heat exchanger 150, it is preferred that the heat transfer media used be fluidic in nature. While solid phase heat transfer media are known in the art (such as silica), assuring a continual flow of such solid phase heat transfer media through small passages in heat exchangers can be difficult, and in general, fluidic heat transfer media are preferred in the present invention. Preferably, system 110 can control (and measure) thermal conditions over a range of about −80° C. to about 200° C. While not shown separately, it is preferable for reaction module 122 to include a plurality of temperature sensors disposed so as to enable temperature conditions to be monitored in various selected locations in the reaction module. Similarly, it is desirable to also include temperatures sensors at a plurality of locations in the residence time chambers. These temperatures sensors can also be employed to measure the temperature of the heat exchange media entering and leaving reaction modules 122 (and/or the residence time chambers). Particularly important locations for incorporating such sensors include those in system 110 where variations and temperature gradients are expected, due to the release or absorption of energy as a result of reaction kinetics.

It should be noted that dilution pumps 118*a* and 118*b* are very important for enabling system 110 to operate continuously and to vary the relative concentrations of each reactant as required to complete the optimization reactions. The concentration of Reactant A and Reactant B can be easily varied (via dilution) by mixing more or less solvent into the reactant feed stream using the dilution pumps. Thus, the concentration of either reactant can be adjusted automatically during the process, instead of requiring manual preparation of different reagent concentrations as in done in the prior art. Significantly, the incorporation of the dilution pumps eliminates the problem of requiring reagent supply vessels to be changed (to enable manually prepared solutions of varying concentration to be introduced into the reaction module). In prior art systems, modifying reactant concentrations is only possible by either terminating an experiment, or by waiting until the experiment is complete, and starting a new experiment using different concentration reactant(s). In contrast, controller 148 can vary the concentration of the reactants continuously during the performance of the optimization experimentation, either randomly, or more preferably, in a predefined manner.

Referring now to analytical unit 146, those of ordinary skill in the art will recognize that a variety of analytical devices are available that might be used for this component, and certain devices are more suited to the detection of a specific product or to monitor a specific quality of the product than others. Clearly, analytical unit 146 must be capable of detecting the desired product of the reaction to be optimized, to enable the quantity and quality of the product to be determined. Preferably a quantitative measurement is obtained, although a qualitative measurement capable of distinguishing between different levels of quality would be useful as well. The product (from reaction module 122 or one of the residence time chambers) is passed over a measuring cell, introduced into a measurement device, exposed to quantum particles, or collected as appropriate for the analytic unit selected. By selecting a non-destructive analytical technique, a second analytical unit (not separately shown) can be used to determine additional information, such as more detailed composition information (for example, the byproducts that are present in the desired product). Analytical units based on the following techniques can be beneficially employed, although it should be understood that the present invention is not limited only to the techniques discussed herein. Nondestructive techniques that can be used include Infrared spectroscopy (including Fourier Transform techniques), Raman spectroscopy, ultraviolet (UV) spectroscopy, and nuclear magnetic resonance (NMR) spectroscopy. Destructive testing techniques that might be used include mass spectroscopy and separation-based analytic techniques, including high performance liquid chromatography (HPLC) and gas chromatography (GC).

FIGS. 1B–1E are based on FIG. 1A, and illustrate various flow paths enabled by manipulating valves 133, 134, 136, and 138. The flow paths enabled in each Figure are shown in bold. FIG. 1F provides details of particularly preferred configuration of the residence time chambers and the reaction module. Note that while FIGS. 1B–1E do not indicate a flow of solvent, it should be understood that the use of a solvent to dilute Reagent A or Reagent B does not affect the flow paths enables by the manipulation of valves 133, 134, 136 and 138. Each valve (i.e. valves 133, 134, 136, and 138; as well as valves 140 and 142) is controllably coupled to controller 148. In one embodiment, controller 148 is configured to selectively actuate valves 133, 134, 136 and 138 according to a predefined pattern to achieve a plurality of optimization experiments, each with a different residence time (Table 1, discussed in detail below, describes one such pattern of 11 optimization experiments covering a relatively broad range of residence times achievable using only three residence time chambers). A working model based on FIG. 1A employs a reaction module having a volume of 2 ml, and residence time chambers each having a volume of 15 ml. Based on a flow rate of 1 ml/min, in the working model Reactants A and B can be processed for as little as 2 minutes (using no residence time modules), or for as long as 47 minutes (using all three residence time modules). Additional residence time variations can be achieved by altering the flow rate. For example, at a flow rate of 10 ml/min, the minimum residence time in the working model is 0.2 minutes (24 seconds), and the maximum residence time in the working model is 4.7 minutes.

It should be noted that the valve configuration (i.e. valves 133, 134, 136, and 138) of FIGS. 1A–1F have been specifically selected for use where the reaction module and each residence time unit are implemented by stacked plates in which openings in individual plates define fluid channels. Such a configuration enables a compact system to be designed, but limits the ability for valves to be placed in between adjacent residence time units and in between the reaction module and residence time chamber 124. Reaction module 122 and residence time modules 124, 126 and 128 are physically stacked on top of one other in such an implementation, as indicated in FIG. 1F. Separation plates 123*a–c* are disposed between the stacked reaction module/residence time chambers. Each separation plate includes fluid channels enabling the immediately adjacent elements to be in fluid communication with each other. Thus an outlet of reaction module 122 is in fluid communication with an inlet of residence time chamber 124 via plate 123*a*, an outlet of residence time chamber 124 is in fluid communication with an inlet of residence time chamber 126 via plate 123*b*, and an outlet of residence time chamber 126 is in fluid communication with an inlet of residence time chamber 128 via plate 123*c*. The fluid channels in plate 123*a* are coupled in fluid communication with valve 133, the fluid channels in plate 123*b* are coupled in fluid communication with valve 134, and the fluid channels in plate 123*c* are coupled in fluid communication with valve 136. Before the system is used for a first optimization reaction, the entire system is flooded with fluid (i.e. the reaction module, the residence time chambers, and the fluid lines coupling such elements). The reaction module and the residence time chambers are always in fluid communication. As a result of pressure build-up against closed valves (valves 133, 134, 136 and 138), fluid that is introduced into the system via the solvent pumps and the reactant pumps flows solely through the open fluid pathways (pathways which are defined by valves 133, 134, 136 and 138). A detailed description of the various fluid paths enabled by valves 133, 134, 136 and 138 is provided below. It should be understood that other valve configurations and other fluid paths can be employed to achieve the desired functionality of enabling fluid exiting from the reaction module to be directed to the analytical unit without passing through each residence time chamber, and to enable fluid exiting each residence time chamber to be directed to the analytical unit. Thus the valve configuration of FIGS. 1A–1F is exemplary, and not intended to limit the present invention.

Figure 1B:
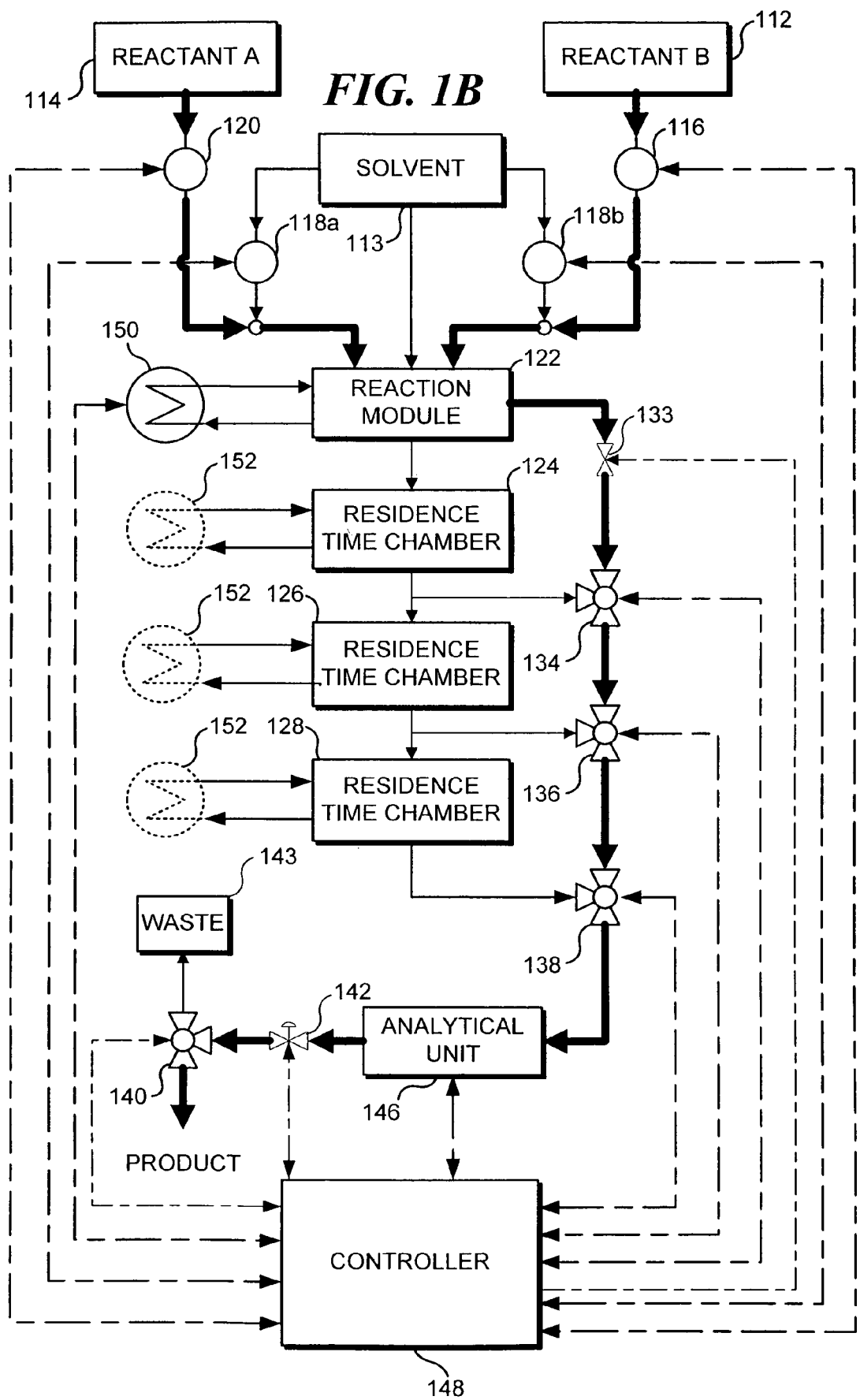
Figure 1C:
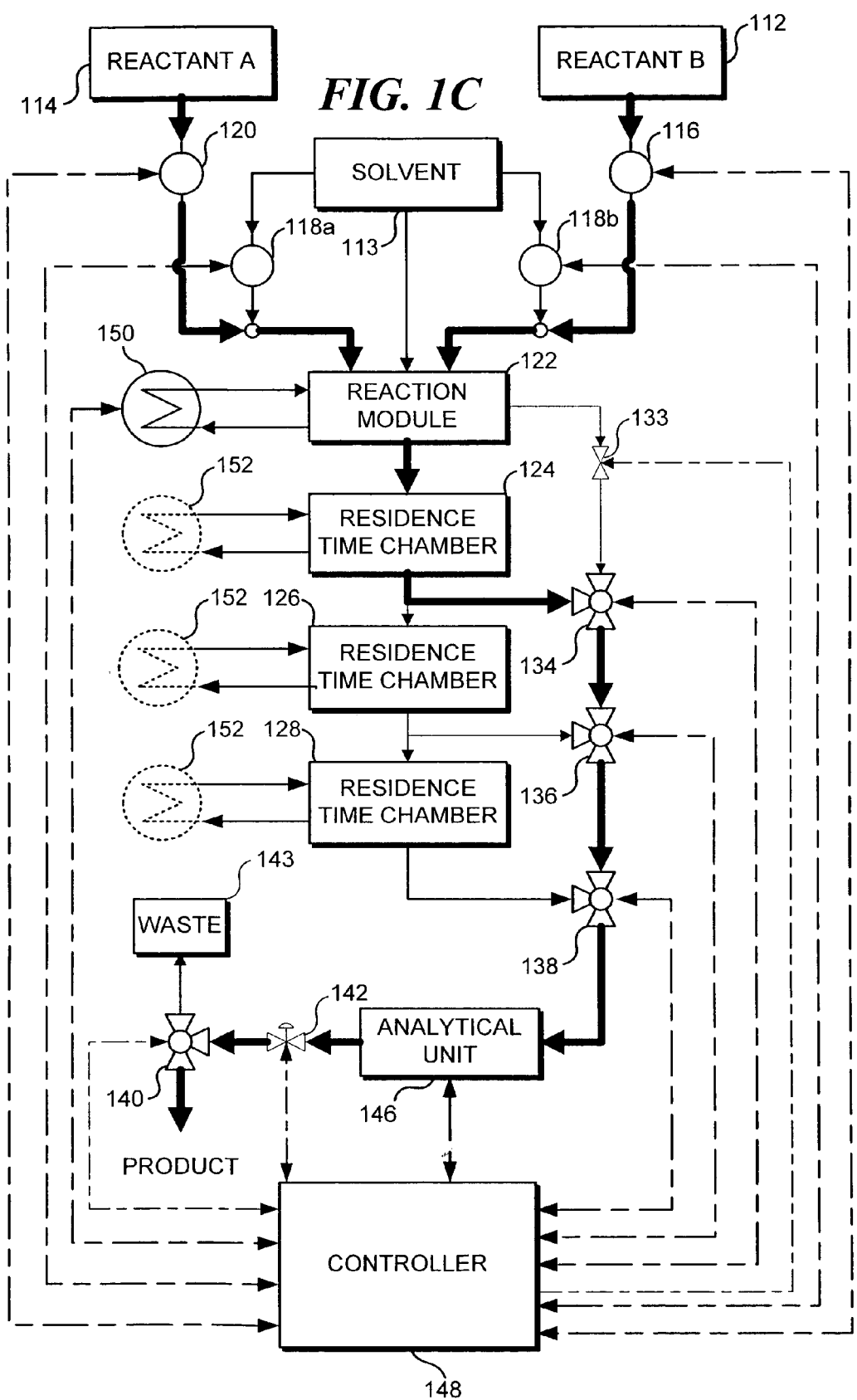
Figure 1D:
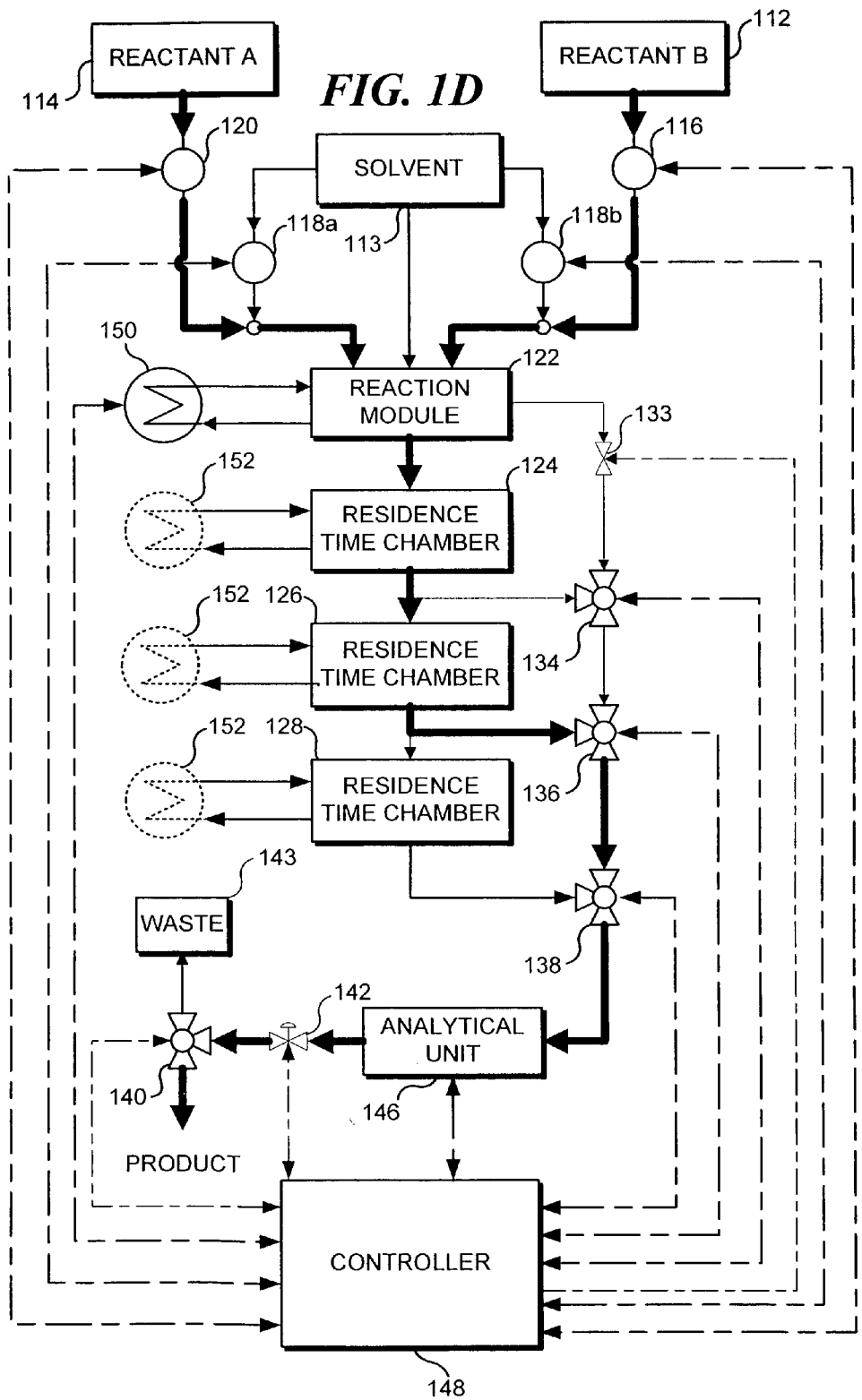
Figure 1E:
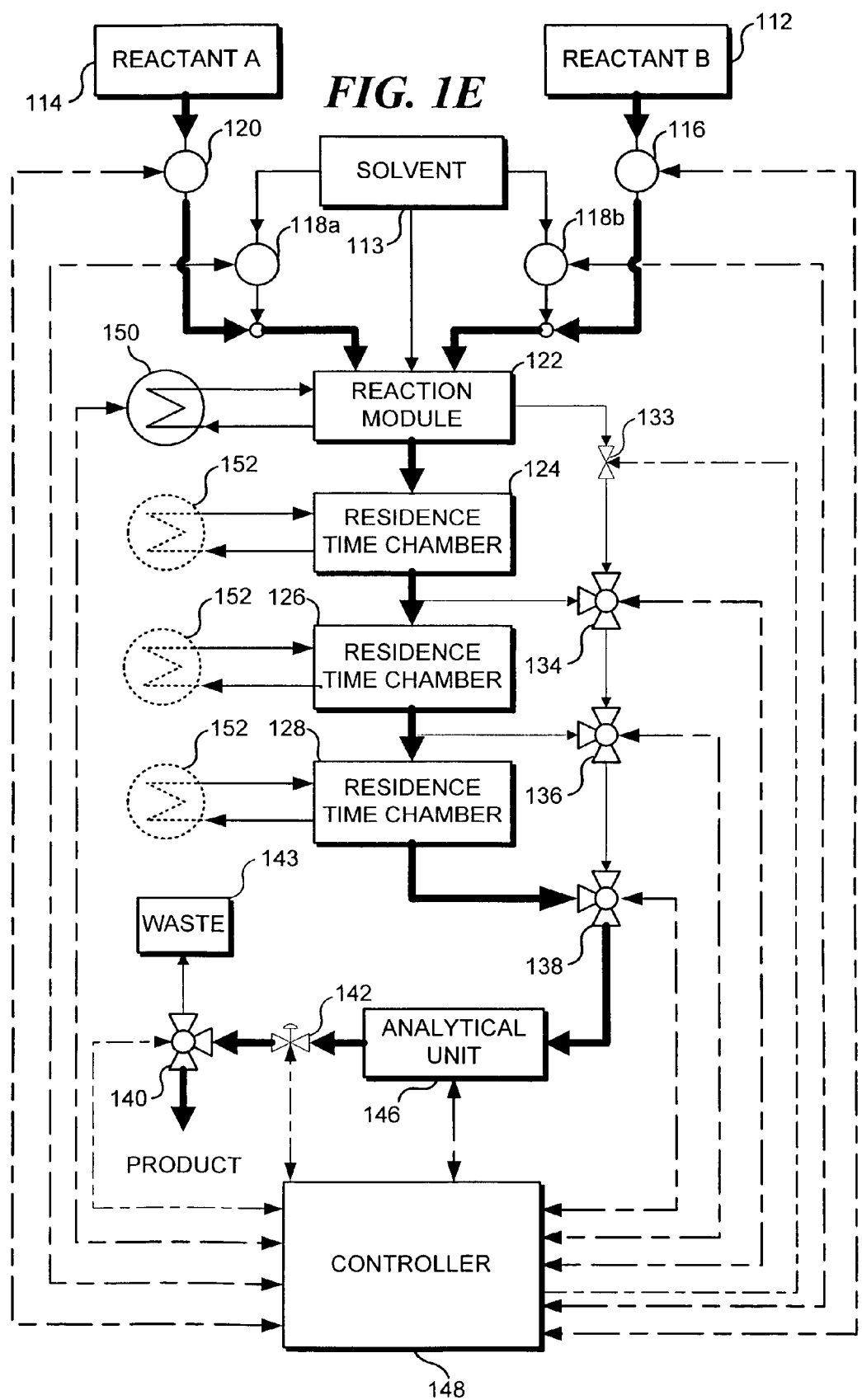
Figure 1F:
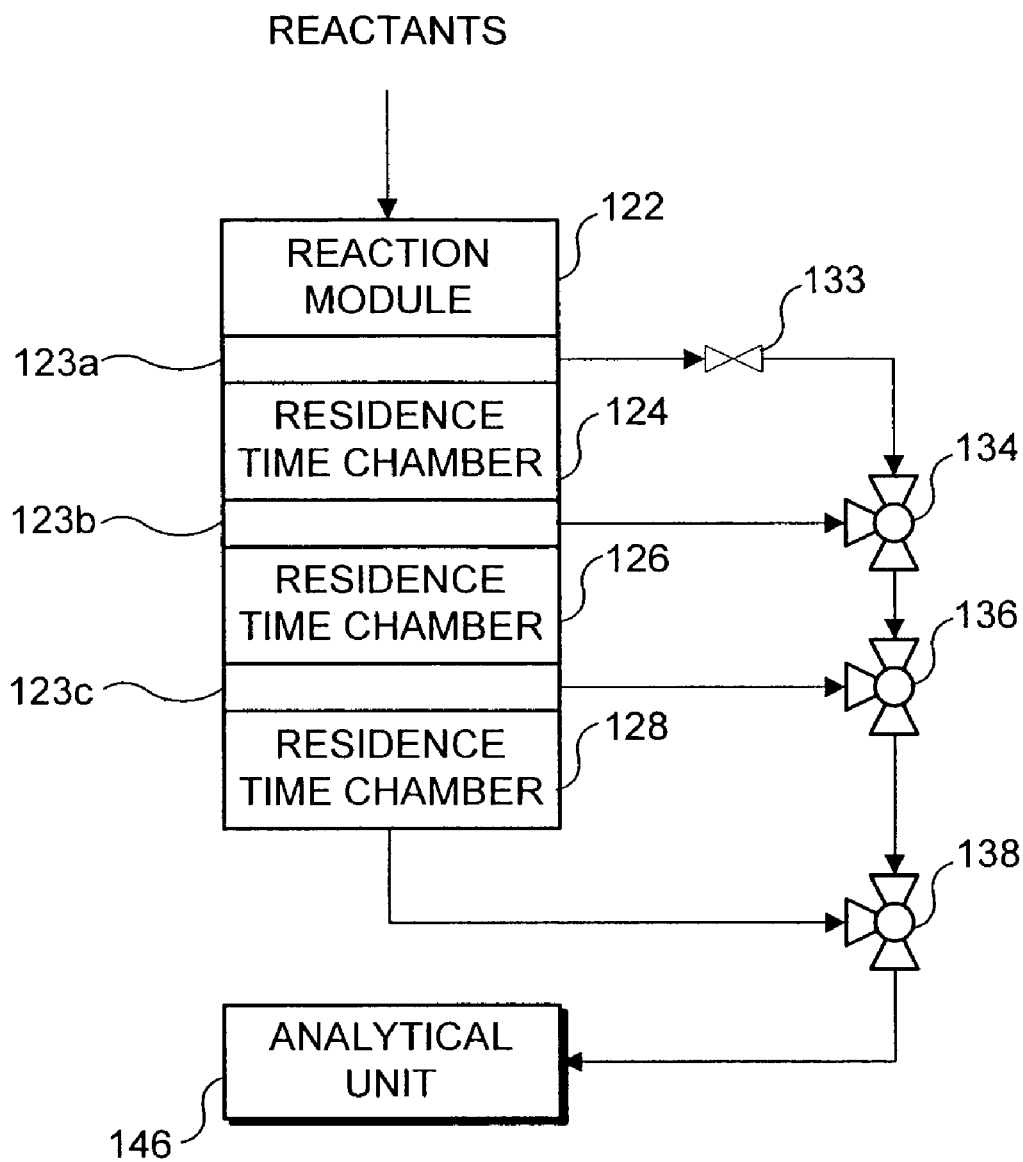

In FIG. 1B, valves 133, 134, 136 and 138 are manipulated such that fluid exiting reaction module 122 bypasses each reaction module, and proceeds directly to analytical unit 146 (each of FIGS. 1B–1E is based on valve 140 directing fluid toward the product outlet, as well as valve 142 not being used as a throttle). Based on a flow rate of 1 ml/min and reaction module 122 having a 2 ml volume, a residence time of 2 minutes is achieved. Valve 133 includes two ports, and when valve 133 is open (as in FIG. 1B) fluid from reaction module 122 is able to pass through valve 133 and proceed to valve 134. When valve 133 is closed, fluid from reaction module 122 flows into the fluid line coupling reaction module 122 to valve 133, but cannot flow past valve 133. Regardless of whether valve 133 is open or closed, reaction module 122 is in fluid communication with residence time chamber 124. When valve 133 is open, and valves 134, 136, and 138 are properly positioned, even though reaction module 122 is in fluid communication with each residence time chamber, the only path enabling fluid to reach analytical unit 146 passes through open valve 133 (as indicated by the bold lines), and not via a fluid path passing through any residence time chamber In FIG. 1C valve 134 is manipulated so that fluid from residence time chamber 124 is directed to valve 136 (and on to analytical unit 146). The states of valves 136 and 138 in FIG. 1C remain unchanged from their respective states in FIG. 1B, so that residence time chambers 126 and 128 remain bypassed. Thus the analytical unit receives fluid that passed through reaction module 122 and residence time chamber 124, but not residence time chambers 126 and 128. Valve 134 includes three ports, and is configured such that at any one time two of the three ports are in fluid communication. In FIGS. 1C–1E, valve 134 is configured to place a fluid line coupling an outlet of residence time chamber 124 in fluid communication a port of valve 136 (as indicated by the bold lines). Note that regardless of the position valve 133, it is the position of valve 134 that determines whether fluid from valve 133, or fluid from an outlet of residence time unit 124, is directed to valve 136. In at least one embodiment, valve 133 is eliminated, and valve 134 alone determines whether fluid from an outlet of reaction module 122, or an outlet of residence time chamber 124, is directed to valve 136. Based on a flow rate of 1 ml/min, reaction module 122 having a 2 ml volume, and each residence time chamber having a volume of 15 ml, a residence time of 17 minutes is achieved.

In FIG. 1D valve 136 is manipulated so that fluid exiting residence time chamber 126 is directed to valve 138 (and on toward analytical unit 146). The state of valve 138 in FIG. 1D remains unchanged from its state in FIGS. 1B and 1C, so that residence time chamber 128 remains bypassed. Thus the analytical unit receives fluid that passed through reaction module 122, residence time chamber 124, and residence time chamber 126, but not residence time chamber 128. Valve 136 includes three ports, and is configured such that at any one time two of the three ports are in fluid communication. In FIGS. 1D–1E, valve 136 is configured to place a fluid line coupling an outlet of residence time chamber 126 in fluid communication a port of valve 138 (as indicated by the bold lines). Note that regardless of the positions of valves 133 and 134, it is the position of valve 136 that determines whether fluid from valve 134, or fluid from an outlet of residence time unit 126, is directed to valve 138. Based on a flow rate of 1 ml/min, reaction module 122 having a 2 ml volume, and each residence time chamber having a volume of 15 ml, a residence time of 32 minutes is achieved.

In FIG. 1E valve 138 is manipulated so that fluid exiting residence time chamber 128 is directed to analytical unit 146), and no residence time chamber is bypassed. Valve 138 includes three ports, and is configured such that at any one time two of the three ports are in fluid communication. In FIG. 1E, valve 138 is configured to place a fluid line coupling an outlet of residence time chamber 128 in fluid communication with analytical unit 146. Note that regardless of the positions of valves 133, 134 and 136, it is the position of valve 138 that determines whether fluid from valve 136, or fluid from an outlet of residence time unit 128, is directed to analytical unit 146. Based on a flow rate of 1 ml/min, reaction module 122 having a 2 ml volume, and each residence time chamber having a volume of 15 ml, a residence time of 47 minutes is achieved. Of course, additional residence times (for any of FIGS. 1B–1E) can be achieved by manipulating the flow rate as well (such as by manipulating the reagent pumps and/or solvent pumps).

Based on FIGS. 1B–1E, one potential series of optimization experiments that can be implemented is as follows. First, the entire system is flushed using a suitable solvent, with each valve being manipulated through their possible states (thus solvent flows into waste container 143 as well as the product outlet downstream of analytical unit 146). This reduces air bubbles in the system which could lead to unstable signals from the analytical unit (which in one preferred embodiment is an infra red (IR) spectrophotometer). The system valves are manipulated to achieve the configuration shown in FIG. 1B (the reaction module output is directed to analytical unit 146) and a series of experiments are conducted using different flow rates (preferably starting with a highest flow rate, thus a lowest residence time). Valve 134 is manipulated to achieve the configuration illustrated in FIG. 1C (i.e. residence time module 124 is being used), and another series of experiments is conducted using different flow rates (again preferably starting with a highest flow rate). Valve 136 is manipulated to achieve the configuration illustrated in FIG. 1D (i.e. residence time modules 124 and 126 are being used), and another series of experiments is conducted using different flow rates (again preferably starting with a highest flow rate). Finally, valve 138 is manipulated to achieve the configuration illustrated in FIG. 1E (i.e. all residence time modules are being used), and another series of experiments is conducted using different flow rates (again preferably starting with a highest flow rate). Preferably, after each change of residence volume or flow rate, the system is allowed to equilibrate (as indicated by a stable signal from the analytical unit) before the next parameter is varied.

Figure 2:
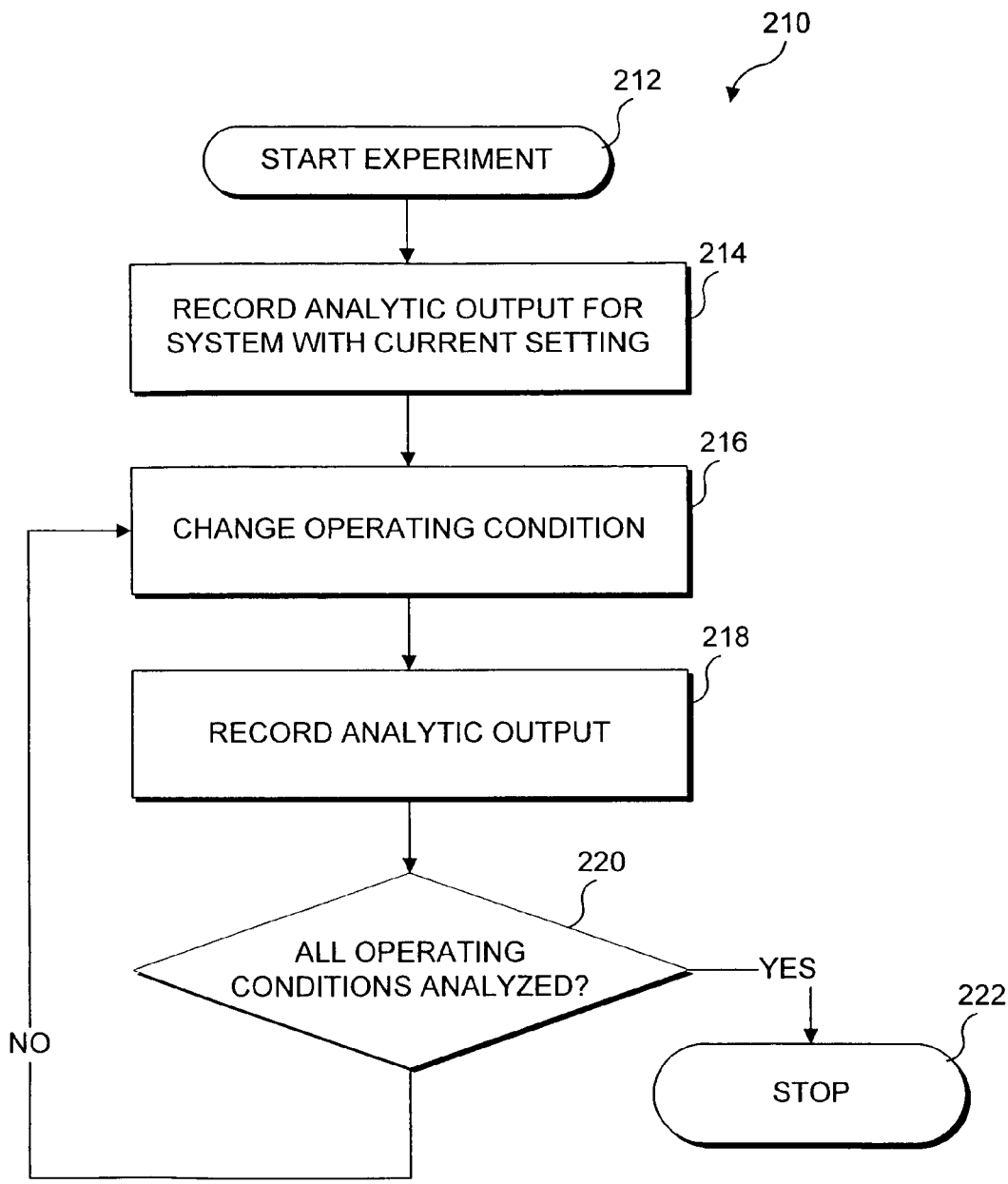
FIG. 2 is a flow chart including the logical steps employed in a first method for optimizing parameters of a continuously running system in accord with the present invention.

FIG. 2 is a flowchart 210 showing the overall logic used in system 110 of FIG. 1A for continually varying and testing a plurality of different reaction parameters to identify optimal reaction parameters for a specific chemical reaction. In a block 212, a first experiment is performed (i.e., Reagent A and Reagent B are introduced into the reaction module under a defined set of reaction parameters). In a block 214, the resulting product is tested and the analytical result (e.g., the product yield or quality) is recorded. In a block 216, one of the reaction parameters (such as temperature, Reactant A concentration, Reactant B concentration, flow rate, or residence time) is varied, and additional quantities of Reagent A and Reagent B are introduced into the reaction module. In a block 218, the product is analyzed and the results recorded.

A decision block 220 determines if additional parameters need to be varied. If so, then the logic terns to block 216. If not, the optimization experiments are completed, and the data collected can be reviewed to determine one or more optimal parameters.

The process in FIG. 2 is based on identifying, in advance, specific parameters to be varied. For example, before the optimization procedure is started, it might be determined that the concentrations of Reagent A and Reagent B will be varied to test a range of concentrations of +/−20% (or some other desired percentage) from baseline concentrations, in 5% increments (or some other desired increment). Temperature conditions can be similarly varied by +/−50 degrees (or some other desired range) from a baseline temperature, in 2 degree increments (or some other desired increment). The baseline values correspond to the initial values selected for the first experiment. The system automatically varies each parameter, until all possible combinations and permutations of the selected variables have been tested.

Figure 3:
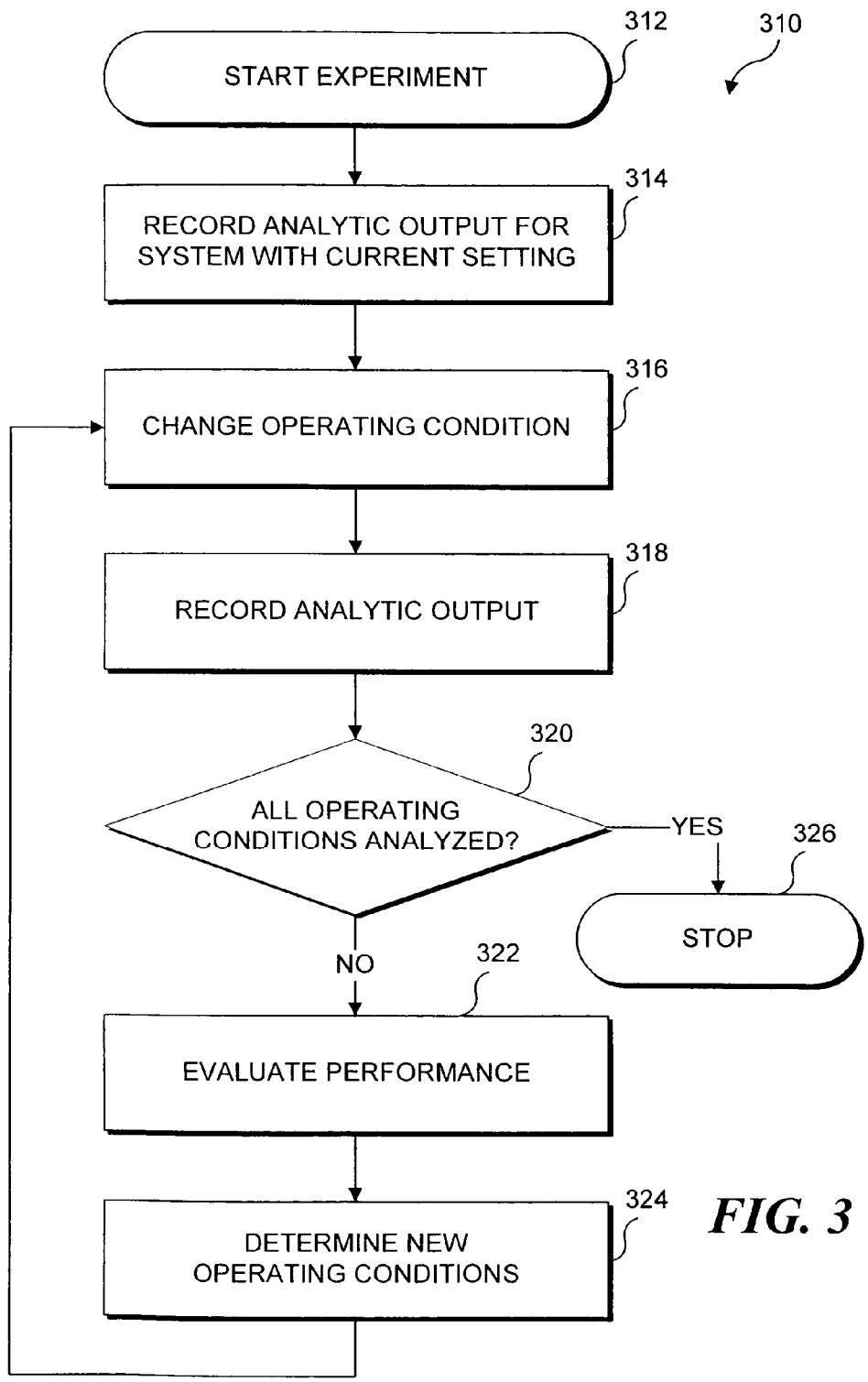
FIG. 3 is a flow chart including the logical steps employed in a second method for optimizing parameters of a continuously running system in accord with the present invention.

The process described by flowchart 310 in FIG. 3 is based on the logic described above in connection with FIG. 2 and includes modifications to increase efficiency. In a block 312, a first experiment is performed using the baseline parameters. In a block 314, the product is tested and the analytical results (such as the product yield) are recorded. In a block 316, one of the reaction parameters is varied, and additional quantities of Reagent A and Reagent B are introduced into the reaction module. In a block 318, the product is analyzed and the results recorded.

A decision block 320 determines if additional parameters need to be varied. If not, the initial optimization experiments are completed. If so, then in a block 322, the data collected are evaluated to identify any trends. For example, data collected might indicate that temperature conditions below a certain level result in poor yield, and if such a trend is detected, then no additional low temperature optimization experiments below that level need to be performed. Thus, in a block 324, new testing conditions are defined, and the logic returns to block 316 to carry out additional optimization experiments based on the new testing conditions.

The logic employed in FIG. 3 is useful when the initial optimization spans a broad range. For example, the initial optimization may define testing parameters for varying temperature over a 100 degree range in 10 degree increments. If a temperature at the low end of the range is tested, followed by a temperature at the middle of the range, and then a temperature at the high end of the range, the results for those experiments can be compared to determine which temperature (low, medium or high) results in a better yield. If the middle range is best, then new testing conditions for temperature can be defined, +/−25% (or some other logical range that is narrower than the original defined range) relative to the initially identified best temperature. This approach tends to reduce the number of optimization experiments required, because additional optimization experiments based on temperatures in the low end and high end of the original testing parameters need not be performed.

Figure 4:
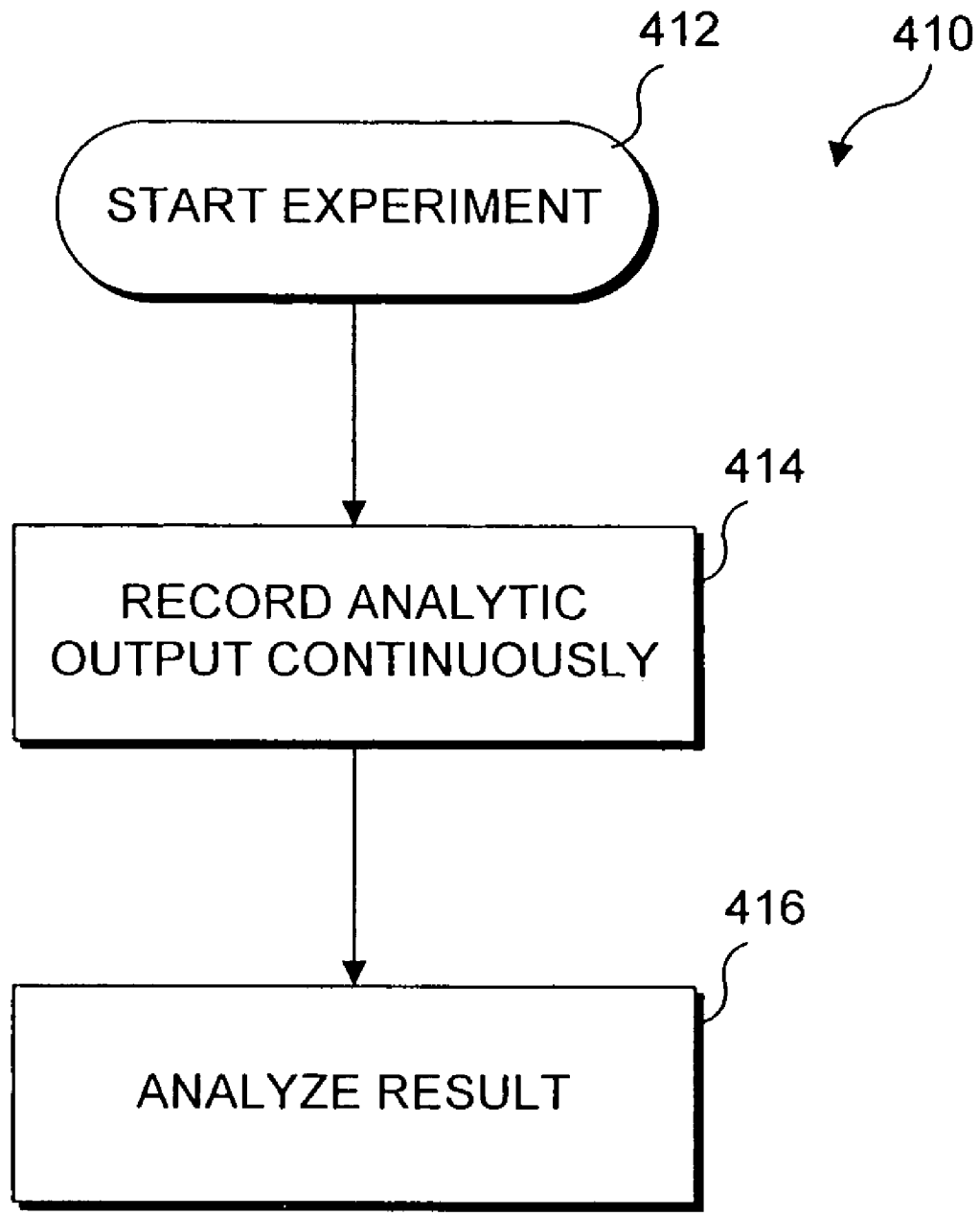
FIG. 4 is a flow chart including the logical steps employed in yet another aspect of the present invention, in which reaction parameters are varied according to periodic functions.

FIG. 4 illustrates a flowchart 410 that can be used for continuously collecting data from a system 110 in which parameter(s) is/are varied according to a periodic function. For example, parameters such as temperature, reactant concentration, and reactant equivalence can be varied according to periodic functions while the system is operated continuously. Reactant equivalence (stoichiometric ratios) can be varied by changing reactant flow rates, and by changing reactant concentration. For example, if it is desired to perform an experiment where two parts of Reactant A are combined with one part of Reactant B, such a ratio can be achieved using a solution of Reactant A that is twice as concentrated as a solution of Reactant B (where each reactant is provided using the same flow rate), or a solution of Reactant A can be provided using a flow rate that is twice as great as a flow rate utilized for Reactant B (where each reactant is provided at the same concentration). Data are continually collected, and the optimal parameters can be selected from the accumulated data. In a block 412, the periodic functions are defined, and the reagents are introduced into the reaction module. As product passes into analytical unit 146 (see FIG. 1A), data are collected and stored, as indicated by a block 414. In a block 416, after the system has been operated continuously for a time sufficient to enable the parameter(s) to be varied according to the periodic function, the results are analyzed to identify the optimal value(s) of the parameter(s).

Figure 5:
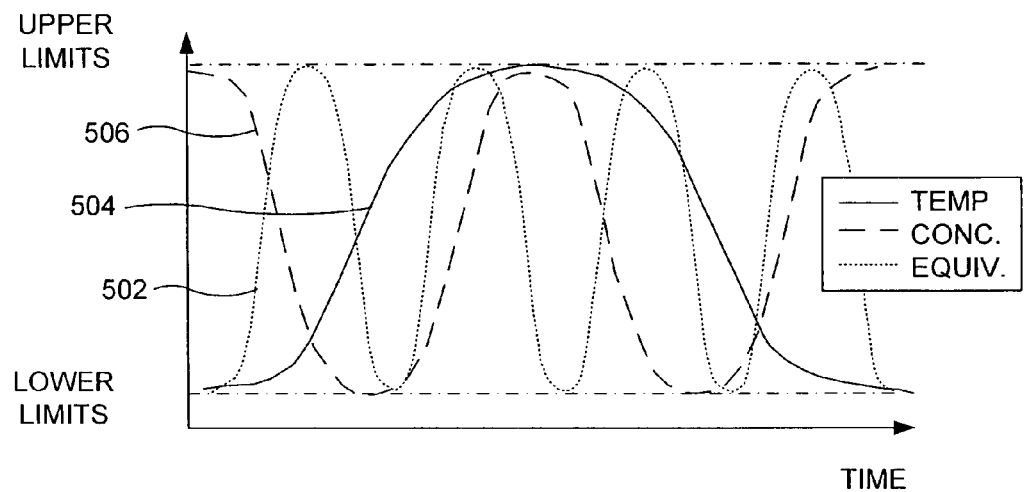
FIG. 5 is a graph showing the result of varying temperature, concentration, and reagent parameters according to periodic functions.

FIG. 5 graphically illustrates periodic functions for reagent equivalence, as indicated by a line 502, temperature, as indicated by a line 504, and reagent concentration, as indicated by a line 506. The parameters fluctuate between defined upper and lower limits. The system is operated until each parameter is able to complete at least one period. Such periodic function-based testing is also applicable to periodically varying residence time as well, by simultaneously varying the flow rates of both reactants without changing the number or reaction time chambers employed.

Figure 6:
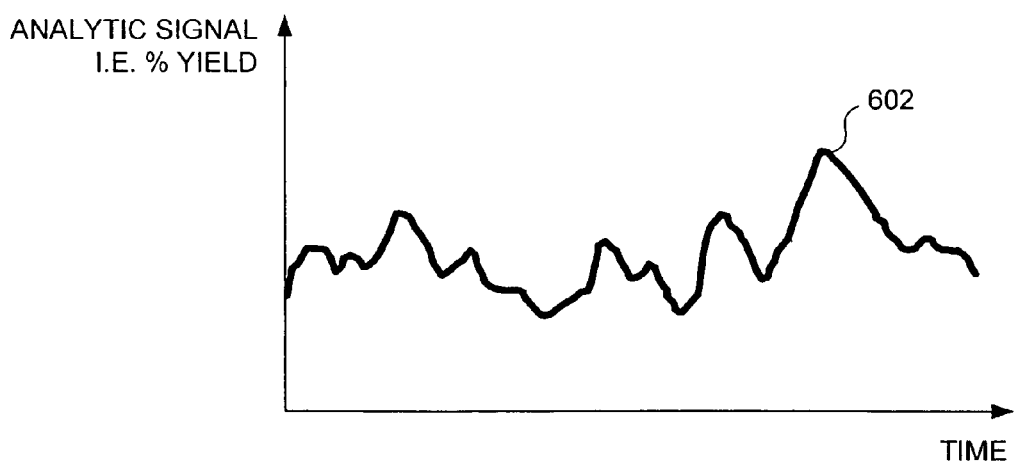
FIG. 6 is an exemplary graph showing a possible result of the periodic variation of FIG. 5.

FIG. 6 graphically displays analytical results collected using the periodic functions of FIG. 5, including a peak 602 clearly indicating the value of the parameter providing the highest yield. FIG. 6 is thus based on simultaneous analysis of operating conditions according to FIG. 5.

Figure 7:
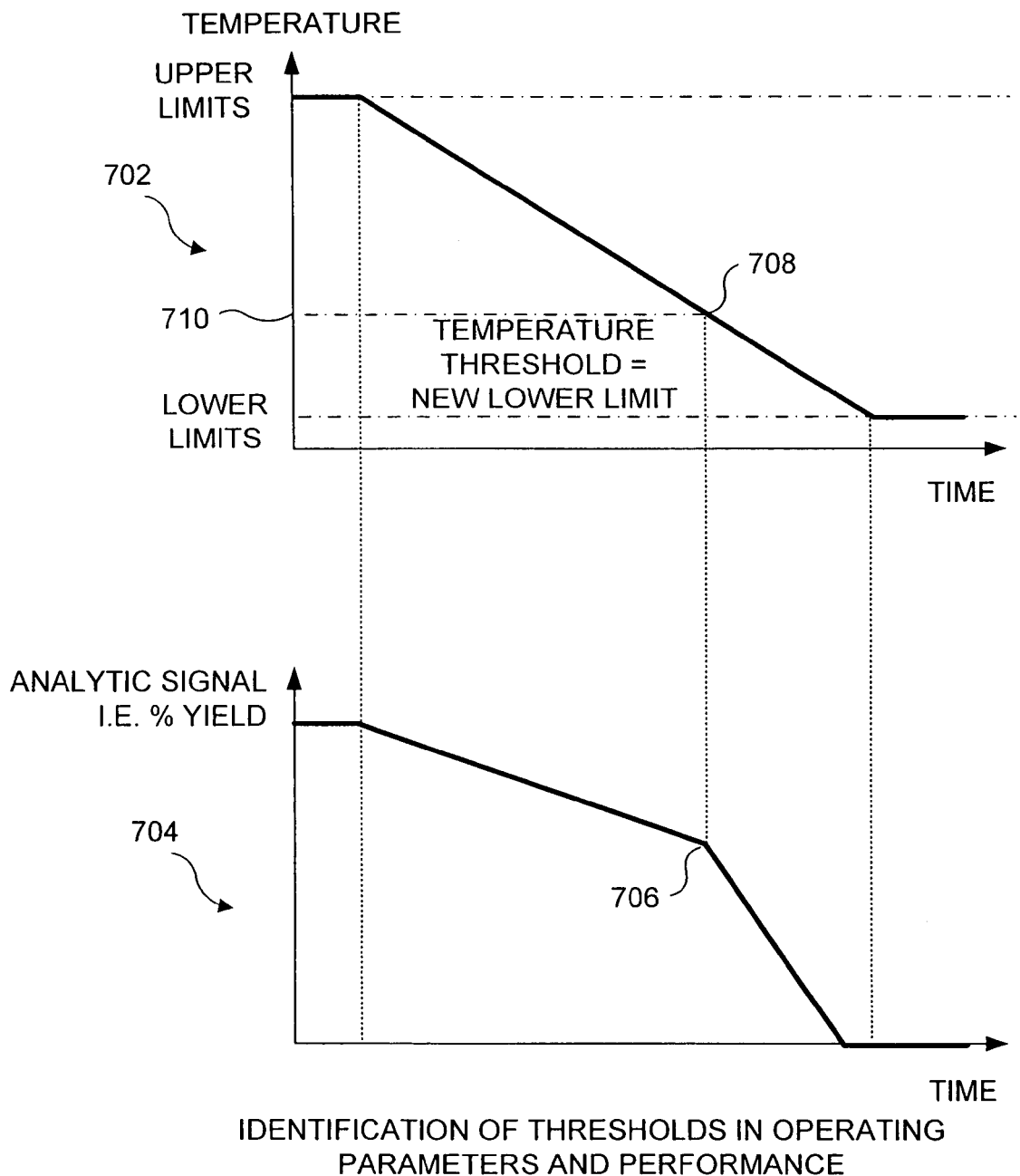
FIG. 7 illustrates graphs of temperature and percent yield versus time showing how thresholds identified in data collected from the continuously running optimization system can be used to determine new limits for variables in further optimization experiments.

FIG. 7 is a graph illustrating how data collected by system 110 can be evaluated to identify new ranges for variables for additional optimization experiments. Portion 702 of FIG. 7 represents a temperature parameter changing over time from a high value to a low value. Portion 704 of FIG. 7 shows the signal amplitude from analytical unit 146 for the same time period. Note that signal amplitude corresponds to percent yield—the higher the signal amplitude, the higher the yield. Note that FIG. 7 is based on changing the value of a parameter based on a linear function (as opposed to the periodic function of FIG. 5). Where discontinuities are identified, additional optimization testing can be performed using parameter values that are changed in smaller increments. It should be understood that the linear variation illustrated in FIG. 7 is not limited to being implemented only for temperature; values for other parameters (concentration and residence time, for example) can also be varied linearly (as well as periodically, as discussed above).

At a point 706, a slope of the signal amplitude changes significantly, and the signal amplitude begins to drop rapidly. Point 706 corresponds to a point 708 in portion 702. Thus, a temperature 710 can be identified at the beginning of the sharp decline in amplitude. That temperature is then selected as the new lower limit, and additional optimization experiments are performed based on the old temperature maximum and the new temperature minimum.

In addition to the method discussed above in connection with FIGS. 2, 3, and 4, system 110 can also be used to improve the efficiency of prior art optimization methods. For example, consider a statistical design optimization involving a set of 34 reaction conditions. In the prior art, a plurality of different reactant supply vessels would be required, with each different concentration of a reactant requiring a separate vessel. Using system 110, only a single reactant supply vessel is required for each reactant, since the solvent supply is employed to enable dilution of the reactants to be achieved to vary the concentration of the reactant. Using system 110, an operator can elect to implement an off-line analytical method (e.g., GC, HPLC), or a real-time method (e.g. FT-IR, Raman spectroscopy). If a real-time analytical method is selected (for implementation by analytical unit 146 of FIG. 1A), the reaction results are analyzed automatically, and a second set of optimization reactions can be automatically defined based on the optimal parameters identified from the first 34 reactions.

One of the prior art method for optimization was based on selecting two values for each reaction parameter, and then performing an additional experiment based on the mean of each variable (i.e., the $2^n+1$ design discussed in the Background of the Invention). System 110 can also be used to increase the efficiency of such an optimization process, as described below.

In this variation, system 110 is filled with solvent (to flush the system), and the system is heated to the operating range required by the high value temperature parameter. If a real-time product analysis (i.e., using analytical unit 146) is implemented, parameters for the optimization experiment with the shortest residence time are implemented, and each reactant is individually passed through the system, such that the analytical unit collects data corresponding to each raw material (i.e. each reactant).

After flushing the system with solvent and cleaning with solvent, the optimization experiment requiring the highest concentration of reagents (and the highest excess of reagents) is introduced into the system, and held for the longest residence time defined in the reaction parameters to be tested. After equilibration of the system, the appropriate valve is selected to employ the residence time chamber providing the shortest residence time. After the corresponding product has been analyzed, the valving is manipulated to select both the longest residence time and the lowest concentration value of the reactants. Because the system is operating continuously, data corresponding to a value between the high value and low value is automatically collected.

As noted above parameters can be changed in several ways. A value for a parameter can be directly set (a step function). A new value for a parameter can be set by making a series of small changes between the old value of the parameter and the new value of the parameter based on a linear function (the ramping shown in FIG. 7.). The value of the parameter can be changed continually based on a periodic function (as shown in FIG. 5). Changing a parameter value based on a series of relatively small linear changes enables linear discontinuities to be investigated. Such linear discontinuities can arise due to material decomposition (which can be experienced with increasing temperature) or side reactions (which can occur when the stoichiometric ratios of the reactants are varied, as excess reagents may be available for such side reactions). Whenever such linear discontinuities are identified, additional optimization experiments wherein parameters are varied in smaller increments about the discontinuity can be performed, to better define the conditions associated with such discontinuities.

For systems where nonlinear dependence on the operating parameters is expected, the continuous nature of the optimization process provided by the present invention implies that the system will pass through the mean value of each parameter while passing from the low value of the parameter to the high value of the parameter (or vice versa). Hence, a selection between $2^n+1$ design experiments (based on assumptions of linearity) versus $3^n$ design experiments (based on assumptions of nonlinearity) are moot when the system of the present invention is used, because the continuously operating system already obtains performance criteria at the intermediate levels of the parameters.

When system 110 includes at least 2 residence time chambers for processing the reactants, one can efficiently determine the high, mean, and low settings for residence times. First, the real-time analytic output for the system is determined based on the product being directed through each residence time chamber sequentially. After the data are collected, the final residence time chamber is bypassed by selecting the appropriate valve. The system responds by evaluating the product output of the preceding residence time chamber, reducing the residence time by a factor related to the residence time chamber volume and the total system volume. Because the analytic signal is almost immediately updated, the entire range of residence times can be evaluated using this approach. For the high-mean-low type experimental design, this capability implies that all 3 values for residence time can be obtained by just switching two valves, and evaluating the performance for all three residence times very quickly. For the other variables (concentration, temperature, and equivalence), the mean can be obtained by selecting one of the high value and the low value, allowing the system to equilibrate, and collecting data. Then a midpoint value is selected (i.e. a value between the high and low values), the system is allowed to equilibrate, and data are collected. Then the other of the high and low values is selected, the system is allowed to equilibrate, and data are collected. Such a process is significantly simpler than the $3^n$ design discussed above.

Collecting real-time analytical data from a continuously running system offers a unique advantage. As values of the parameters are changed, data are collected not just for each individual value selected, but also for every value between the selected values. The main problems with the statistical approach used in the prior art batch approach, i.e., that no significant improvement was identified because a range selected was too narrow, or no improvement was identified when the reaction fails because the range selected was too broad, can be automatically avoided, and the optimization can be carried out without performing useless experiments.

Even if in the case of continuously changing reaction parameters from one value to the other value, there is an uncertainty as to what specific reaction parameters correspond to specific data collected by the system, a range of probable parameters can be readily determined. Then a new optimization based on that range can be performed to more specifically identify the optimal parameters.

A significant improvement over the statistical design experiments noted above can be achieved in a continuously running system equipped with a real-time analytical device, if at least two variables are changed at the same time, where the two variables are changed between upper and lower values, and the changes are implemented with different periods (see FIG. 5). Experimental results for all possible permutations of the variables are thus rapidly achieved. Analyzing the reaction results (yield of desired product, amount of undesired product) regarding the time dependency (i.e., using a Fourier transform analysis) shows the influence of the different variables on the result (see FIG. 6). Even if the precise reaction condition experienced by the product being currently analyzed is not precisely known due to the periodically changing conditions (i.e., in a non-stationary system), a reasonable approximation of those conditions can be identified based on the periodic function controlling the variability and based on knowledge about the fluidic configuration of the system. This approximation can then be used as a starting point for additional optimization reactions that efficiently produce still better values of the parameters for the optimal reaction.

Traditional experimental optimization techniques use a plurality of individual reaction vessels. Each reaction vessel includes reactants having different concentrations. Each reaction vessel is operated for given duration, and the products from each reaction vessel are analyzed and evaluated. The present invention enables reaction concentrations to be varied using a single reaction module, and eliminates the need for each reagent concentration to be separately prepared. Even more significant are the time savings the present invention achieves in analyzing the effects of temperature variations on given reactant concentrations, as well as the effects of different residence times, within a single system. Table 1 (below) provides a sample set of experiments using flow rates and valve settings that cover a broad range of reaction times with only small variations in flow rates. Significantly, the quantity of optimization data that can be obtained by the system of the present invention is an order of magnitude higher than the quantity of data obtainable by any single prior art system.

Another significant advantage of the present invention relates to the fact that prior art systems for varying temperature included a plurality of reaction vessels disposed relatively close to one another, where each reaction vessel was operated at a different temperature. Temperature difference between reaction vessels could vary by as much as 300° C., significantly increasing the complexity of the thermal controls required by the system. This problem is important, because in the case of even slightly complex reactions, changes in temperature can cause a series of side reactions or chain reactions to be initiated, or to be stopped. Thus, temperature control is very important.

One goal for determining optimal reaction parameters in the laboratory is to ensure that the parameters thus determined are also applicable to systems wherein larger volumes of the desired product are produced than were produced during laboratory testing. Due to scale-up complications, optimal reaction conditions identified using conventional optimization techniques in the laboratory are not always carried over or applicable to the same reaction implemented in large scale reactors. Using the system of the present invention, it is possible to generate relatively large volumes of material by operating identical systems in parallel. Using parallel systems to generate production quantities, as opposed to using a single large reactor, eliminates the problem of determining optimal conditions in a relatively small reactor, which are also applicable for producing the desired product in a relatively large reactor, because the parallel production reactors are identical to the reactor used in the present invention to determine the optimal process conditions.

TABLE 1

Exemplary Order of Experiments

| Experiment # | # of Residence Time Units | Residence Time Volume (ml) | Total Flow Rate (ml/min) | Resulting Residence Time (min) |
|---|---|---|---|---|
| 1 | 3 | 47 | 1 | 47.00 |
| 2 | 3 | 47 | 2 | 23.50 |
| 3 | 3 | 47 | 3 | 15.67 |
| 4 | 2 | 32 | 3 | 10.67 |
| 5 | 2 | 32 | 4 | 8.00 |
| 6 | 1 | 17 | 3 | 5.67 |
| 7 | 1 | 17 | 4 | 4.25 |
| 8 | 0 | 2 | 1 | 2.00 |
| 9 | 0 | 2 | 2 | 1.00 |
| 10 | 0 | 2 | 3 | 0.67 |
| 11 | 0 | 2 | 4 | 0.50 |

Table 1 indicates the residence times that can be achieved using three residence time units and flow rates ranging between 1 and 4 ml/min (the linear region for precision pumps). Note that by implementing only 11 experiments, a relatively broad range of constantly decreasing residence times (between 47 minutes to 0.5 minutes) can be achieved. The controller automatically switches the valves required to enable the above residence times to be achieved.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. An automated reaction system for continuously performing a plurality of optimization experiments to enable at least one optimal reaction parameter for a reaction to be identified, the reaction producing a desired product, comprising:
   (a) a controller, said controller being configured to monitor and control the system while continuously performing a plurality of optimization experiments, such that during each of the plurality of optimization experiments, at least one of a plurality of reaction parameters controlled by the controller is changed according to a predefined protocol, the plurality of reaction parameters including at least the parameters of temperature and reactant concentration, the plurality of optimization experiments enabling optimal reaction parameters to be identified;
   (b) a reactant supply source for each reactant required for the reaction;
   (c) a solvent supply source coupled in fluid communication with each reactant supply source;
   (d) a dilution pump for each reactant, each dilution pump being coupled in fluid communication with a corresponding reactant supply source and with the solvent supply source for a corresponding reactant, and being logically coupled to the controller and operative to vary a concentration of a corresponding reactant using a solvent;

(e) a reaction module having an inlet coupled in fluid communication with each reactant supply source and the solvent supply source to receive each reactant, and an outlet, the reaction module being operative to initiate the reaction of the reactants; and (f) at least one analytical unit coupled in fluid communication with the outlet and logically coupled with the controller, the analytical unit being configured to analyze the desired product, producing data for the plurality of optimization experiments used to determine at least one optimal reaction parameter.

2. The automated reaction system of claim 1, further comprising a reactant pump for each reactant required for the reaction, each reactant pump being logically coupled to the controller and operative to provide a flow of a corresponding reactant to the inlet of the reaction module.

3. The automated reaction system of claim 1, further comprising at a plurality of residence time chambers, each resident time chamber being configured to be coupled in fluid communication between the outlet of the reaction module and the analytical unit.

4. The automated reaction system of claim 3, wherein the controller carries out a plurality of functions, including:
(a) directing a flow of fluid from the outlet of the reaction module sequentially into each of the plurality of residence time chambers;
(b) directing a flow of fluid from the outlet of a last of the plurality of residence time chambers, which is last to sequentially receive the flow of fluid from the outlet, into the analytical unit;
(c) obtaining data from the analytical unit for a fluid exiting the last residence time chamber; and
(d) after data have been obtained from the analytical unit for the fluid exiting the last of the plurality of residence time chambers, carrying out a further plurality of functions, including:
(i) isolating the last of the plurality of residence time chambers from the analytical unit;
(ii) directing a flow of fluid from the outlet of a preceding residence time chamber into the analytical unit; and
(iii) obtaining data from the analytical unit for a fluid exiting the preceding residence time chamber.

5. The automated reaction system of claim 1, wherein the predefined protocol comprises at least one of:
(a) implementing a plurality of optimization experiments in which each reaction parameter has been predefined;
(b) implementing a plurality of optimization experiments in which each reaction parameter is varied between a predefined maximum value and a predefined minimum value based on a predefined function; and
(c) implementing a plurality of optimization experiments in which each reaction parameter in an initial set of optimization experiments is predefined, and in which at least one reaction parameter in a later set of optimization experiments is determined based on results from the initial set of optimization experiments.

6. The automated reaction system of claim 1, further comprising a heat exchanger configured to thermally condition each reactant entering the reaction module, the heat exchanger being logically coupled to and controlled by the controller.

7. The automated reaction system of claim 6, wherein the controller controls a flow of a temperature conditioned fluid through the heat exchanger to vary a thermal condition in the reaction module over time, such that the analytical unit collects data corresponding to a plurality of different thermal conditions in the reaction module, to determine an optimal thermal condition for the reaction.

8. The automated reaction system of claim 1, wherein the controller controls each dilution pump to vary a concentration of each reactant over time, such that the analytical unit collects data corresponding to a plurality of concentrations of each reactant, to enable an optimal concentration of each reactant to be identified for the reaction.

9. The automated reaction system of claim 1, wherein the controller controls a plurality of reaction parameters according to a periodic pattern, such that the analytical unit collects data corresponding to a plurality of values for each reaction parameter, to determine an optimal value for each reactant parameter.

10. The automated reaction system of claim 9, wherein the controller varies the predefined pattern based on the data produced by the analytical unit.

11. The automated reaction system of claim 9, wherein the controller simultaneously varies at least two reaction parameters based on a periodic function.

12. The automated reaction system of claim 11, wherein each of the at least two reaction parameters are varied by the controller according to different periodic functions.

13. The automated reaction system of claim 12, wherein the controller further:
(a) evaluates the data produced by the analytical unit after each of the at least two reaction parameters are varied according to their respective periodic functions;
(b) identifies new upper and lower boundaries for at least one of the at least two reaction parameters;
(c) based on the new upper and lower boundaries, redefines at least one periodic function; and
(d) simultaneously varies each of the at least two reaction parameters based on the periodic functions, using each that has been redefined.

14. The automated reaction system of claim 1, wherein the controller implements the following functions:
(a) uses a baseline value for each reaction parameter to generate the desired product;
(b) determines at least one of a quantity and a quality of the desired product generated using the baseline values;
(c) changes the baseline value for at least one reaction parameter, thereby affecting the desired product being produced by the automated system; and
(d) determines at least one of a quantity and a quality of the desired product generated using the at least one baseline value that was changed.

15. The automated reaction system of claim 1, wherein the controller implements the following functions:
(a) uses a baseline value for each reaction parameter to generate the desired product;
(b) determines at least one of a quantity and a quality of the desired product generated using the baseline values;
(c) changes the baseline value for at least one reaction parameter according to a linear function, thereby affecting the desired product being produced by the automated system; and
(d) determines at least one of a quantity and a quality of the desired product generated using the at least one baseline value that was changed, such that if data corresponding to at least one of a quantity and a quality of the desired product generated using the at least one baseline value that was changed is indicative of a linear discontinuity, then for each value corresponding to a linear discontinuity, defining that value as a baseline value and repeating functions (a)–(d).

* * * * *